BAND COMPRESSION TELEVISION SYSTEM

Filed June 3, 1950 12 Sheets-Sheet 1

INVENTOR
P.M.G. TOULON
BY Moore and Hall
ATTORNEYS

Feb. 25, 1958 P. M. G. TOULON 2,824,904

BAND COMPRESSION TELEVISION SYSTEM

Filed June 3, 1950 12 Sheets-Sheet 2

| | | | | | | | | | | | | | | |
|---|---|---|---|---|---|---|---|---|---|---|---|---|---|---|
| 1 | 26 | 51 | 2 | 27 | 52 | 3 | 28 | 53 | 4 | 29 | 54 | 5 | 30 | 55 |
| | | | | | | | | | | | | | | |
| 6 | 31 | 56 | 7 | 32 | 57 | 8 | 33 | 58 | 9 | 34 | 59 | 10 | 35 | 60 |
| | | | | | | | | | | | | | | |
| 11 | 36 | 61 | 12 | 37 | 62 | 13 | 38 | 63 | 14 | 39 | 64 | 15 | 40 | 65 |
| | | | | | | | | | | | | | | |
| 16 | 41 | 66 | 17 | 42 | 67 | 18 | 43 | 68 | 19 | 44 | 69 | 20 | 45 | 70 |
| | | | | | | | | | | | | | | |
| 21 | 46 | 71 | 22 | 47 | 72 | 23 | 48 | 73 | 23 | 49 | 74 | 25 | 50 | 75 |
| | | | | | | | | | | | | | | |

INVENTOR
P. M. G. TOULON
BY Moore and Hall
ATTORNEYS

Feb. 25, 1958 P. M. G. TOULON 2,824,904

BAND COMPRESSION TELEVISION SYSTEM

Filed June 3, 1950 12 Sheets-Sheet 3

INVENTOR

P. M. G. TOULON

BY Mosie and Hall.

ATTORNEYS

Feb. 25, 1958 P. M. G. TOULON 2,824,904

BAND COMPRESSION TELEVISION SYSTEM

Filed June 3, 1950 12 Sheets-Sheet 4

INVENTOR
P. M. G. TOULON
BY Moore and Hall.
ATTORNEYS

Feb. 25, 1958 P. M. G. TOULON 2,824,904

BAND COMPRESSION TELEVISION SYSTEM

Filed June 3, 1950 12 Sheets-Sheet 5

INVENTOR
P. M. G. TOULON
BY Moore and Hall
ATTORNEYS

Feb. 25, 1958 P. M. G. TOULON 2,824,904

BAND COMPRESSION TELEVISION SYSTEM

Filed June 3, 1950 12 Sheets-Sheet 6

INVENTOR
P. M. G. TOULON

BY Moore and Hall
ATTORNEYS

BAND COMPRESSION TELEVISION SYSTEM

INVENTOR
P.M.G. TOULON

BY Moore & Hall

ATTORNEYS

BAND COMPRESSION TELEVISION SYSTEM

Filed June 3, 1950 12 Sheets-Sheet 8

INVENTOR
P. M. G. TOULON
BY Moore and Hall.
ATTORNEYS

BAND COMPRESSION TELEVISION SYSTEM

Filed June 3, 1950

INVENTOR

P. M. G. TOULON

BY Moore & Hall

ATTORNEYS

INVENTOR
P. M. G. TOULON
BY Moore & Hall
ATTORNEYS

Feb. 25, 1958 P. M. G. TOULON 2,824,904

BAND COMPRESSION TELEVISION SYSTEM

Filed June 3, 1950 12 Sheets-Sheet 11

INVENTOR
P. M. G. TOULON

BY Moore & Hall

ATTORNEYS

Feb. 25, 1958 P. M. G. TOULON 2,824,904

BAND COMPRESSION TELEVISION SYSTEM

Filed June 3, 1950 12 Sheets-Sheet 12

INVENTOR

P.M.G. TOULON

BY Moore & Hall.

ATTORNEYS 2,824,904
Patented Feb. 25, 1958

2,824,904

BAND COMPRESSION TELEVISION SYSTEM

Pierre Marie Gabriel Toulon, New York, N. Y., assignor, by mesne assignments, to Moore and Hall, Washington, D. C., a partnership Application June 3, 1950, Serial No. 166,013

Claims priority, application France June 9, 1949

35 Claims. (Cl. 178—6)

This invention relates to transmission systems and more particularly to apparatus for sending intelligence from one point to another with reduced bandwidth. The invention may be used to send television signals or color television signals with reduced bandwidth.

A primary object of this invention resides in the provision of a practical system for transmitting intelligence from one place to another with reduced bandwidth. Another object is to provide improvements in such a system to effect low cost. Other objects will appear as this description proceeds.

Although the number of points scanned in each station remains the same, it is still possible to reduce the required number of informations through the cable (or example a coaxial one) connecting the two stations. The invention when applied to television is based upon the optical property of the eye which requires a high accurate flickerless definition as long as the picture is not moving, but tolerates a low definition when the picture is rapidly changing. In the process according to the invention when the picture is not moving, the same intelligence once transmitted is used successively as often as for instance five times. Therefore a great finesse is obtained without flicker. At the points where the picture is changing, an automatic enlargement of the point is realized momentarily so as to give immediately a coarse indication of the new aspect of the changing part of the picture.

A picture of 525 horizontal lines, each line having 500 points at 60 frame interlaced scanning requires 7,800,000 values of voltage in the channel and consequently a bandwidth of more than 3.5 megacycles. It is well known that it is extremely difficult to transmit color within that bandwidth, unless some special device is provided.

According to the invention the number of intelligence signals is reduced up to for instance, five times, so that a band lower than for instance three megacycles is sufficient to produce the same apparent result for color and resolution. The invention uses an automatic process of repetition of the points while the picture is not changing and provides an automatic enlargement of the point while the picture is changing.

The invention may use the dot interlaced technique, or "knight's move" technique such as described in my U. S. Patent 2,479,880 of August 24, 1949, in which the total surface of the screen is divided in a great number of checkerboard cases, each case having the same number of points.

One form of the invention which has a bandwidth of one-fifth that of a conventional system will now be very briefly described. During the first scanning of an area only one-fifth of the spots are transmitted, and during the next scanning another series of spots which comprise one-fifth of the total are transmitted. This process is repeated for five scannings at which time all spots will have been scanned and the information sent over the connecting cable to the receiving terminal of the cable.

Five records of the five successive field scannings are made successively at the receiving terminal of the cable, in five separate magnetic recorders. Each record is read again through an independent reading device and resulting currents are supplied in five distinct channels. These five channels are sampled to locally rebuild a new high definition video intelligence current that is practically the same as the initial high definition video intelligence for the eye of the observer. When the televised subject is not moving, the reading of each record is made five times, and the new high definition channel uses five times the same indication in the course of five successive field scannings. Consequently the information required to be transmitted through the cable is five times less than in the classical transmission process. The beam scanning frequency at the receiver remains the same as now used, namely $2 \times 30$ per second in the line interlaced method. Consequently if the subject is not moving, a very fine picture appears on the screen in spite of the low rate of intelligence transmission.

When the subject is moving, a switching device is actuated with the purpose of spreading the voltage value of the last field point value to as many as five consecutive points of picture.

According to an embodiment of the invention for operating said switching device the successive values of the recorded intelligence for each dot of the picture are compared one with the other explored at a time spacing of five fields. When a substantial change is noticed by the comparing device, the new value of density is automatically applied to the receiver output. This new value is applied to the two preceding and the two following dot locations along the same line.

Each magnetic recorder and each magnetic reader, above described, in this system are required to be operated at the maximum band capacity of the cable, for instance three megacycles. One alternate means of the invention provides the use of cathode ray memory tubes for recording and reading the intelligence. In accordance with the described means relating to magnetic recorders the inertia limitations of said means lead to provide a multiplicity of such recorder and reader combinations each operating at their maximum limit of useful frequency which is only a small fraction of that of the cable. A high speed pulse distribution system as described in my Patent 2,471,253 is used for the purpose of distributing the successive pulses of video intelligence to the multiplicity of magnetic recorders working simultaneously each on a fraction of the total intelligence. The pulses generated by the reader head of the magnetic recorder are sampled with a second high speed distributing system used to combine the pulses into final video intelligence channel for local retransmission to the home television receivers.

In order to make the recording easier, a high frequency modulating device is provided for actuating each individual channel of each recorder. These modulating devices are supplied through a common heterodyne.

Means for erasing the recording are provided ahead of the recording and reading device.

Figures 1, 1A, 1B:
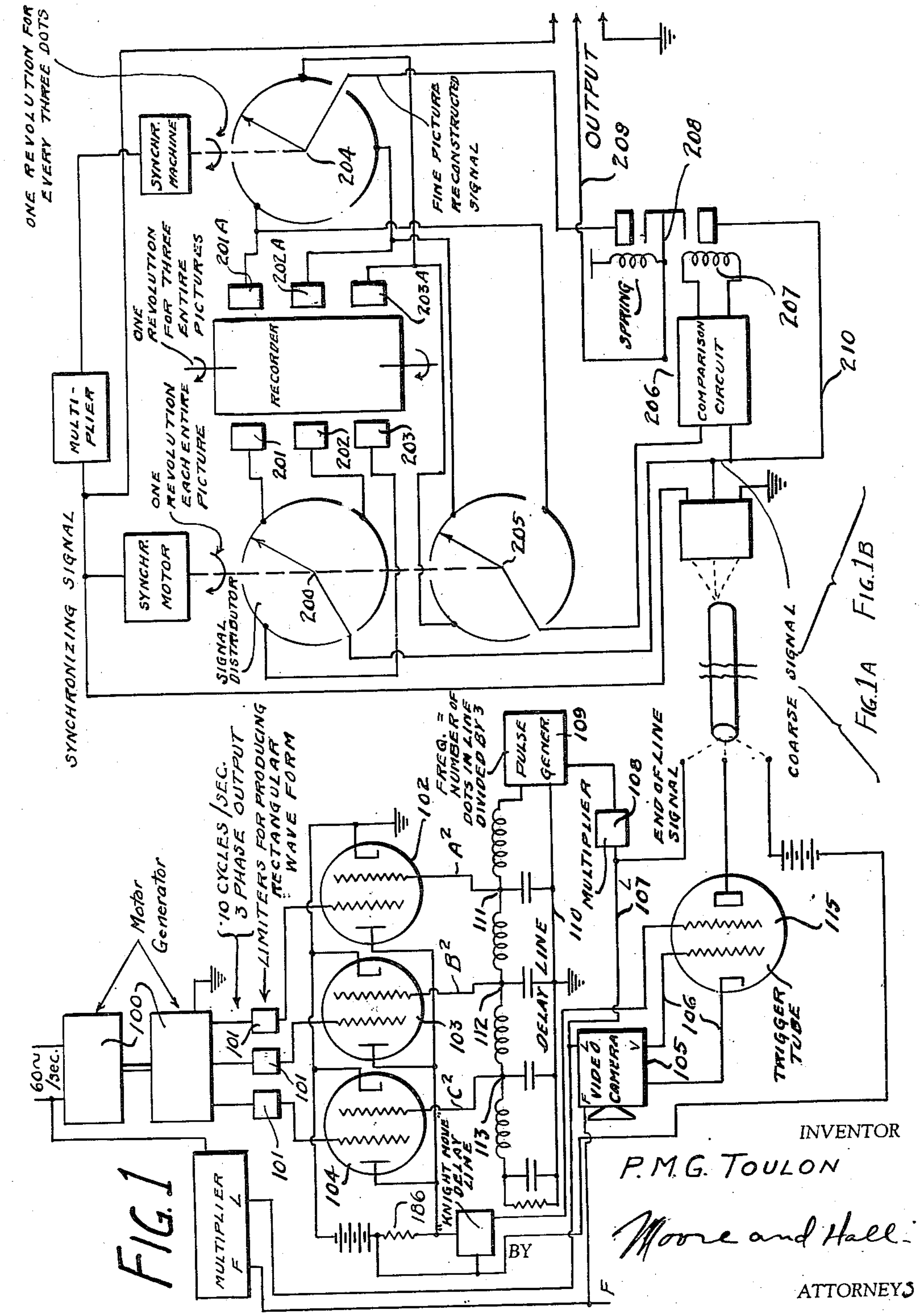
Figure 1 is a simplified showing of the system and has two parts, Figure 1A being the originating station and Figure 1B being the receiving (relaying) station.
Figure 3A:
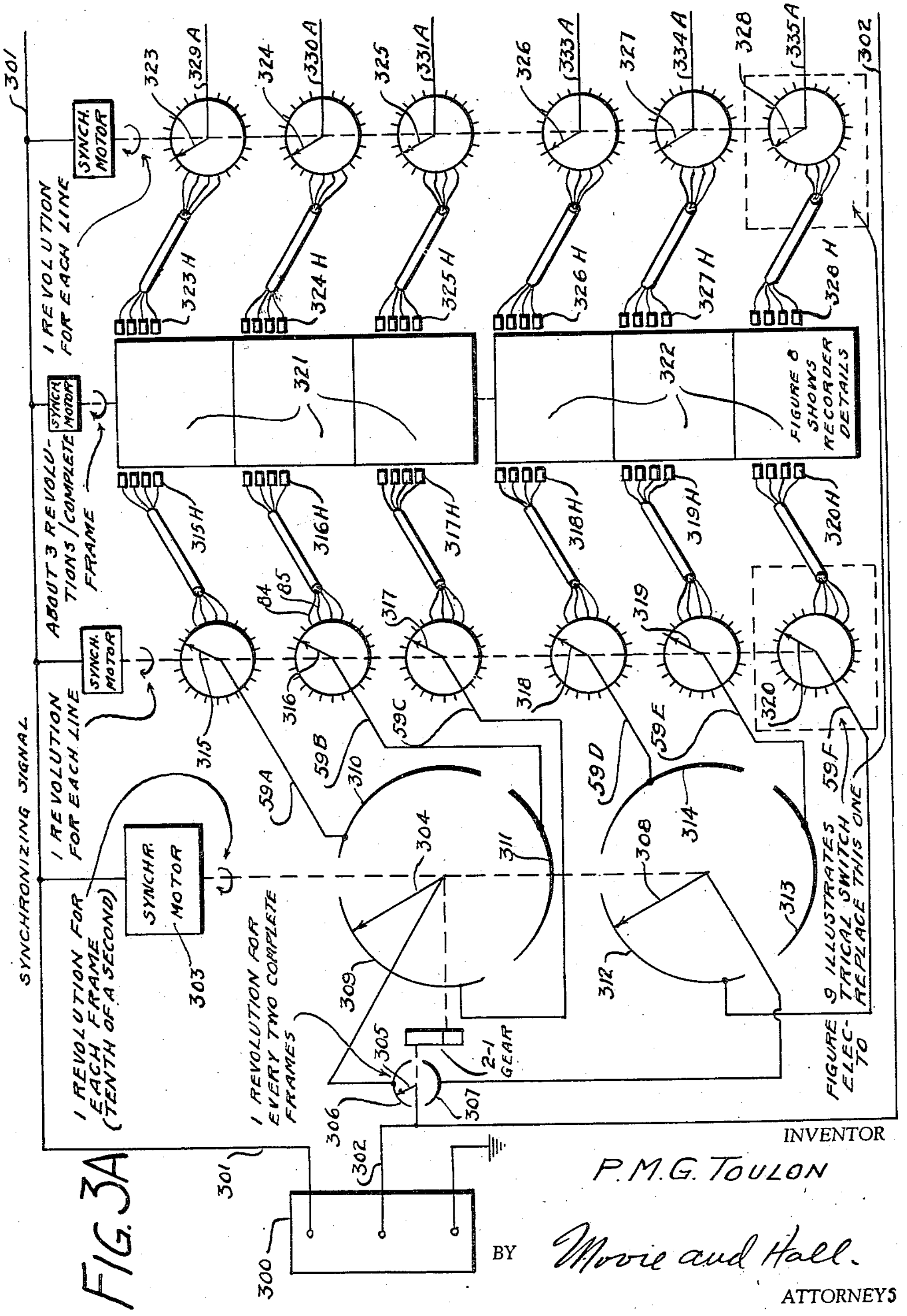
Figure 3B:
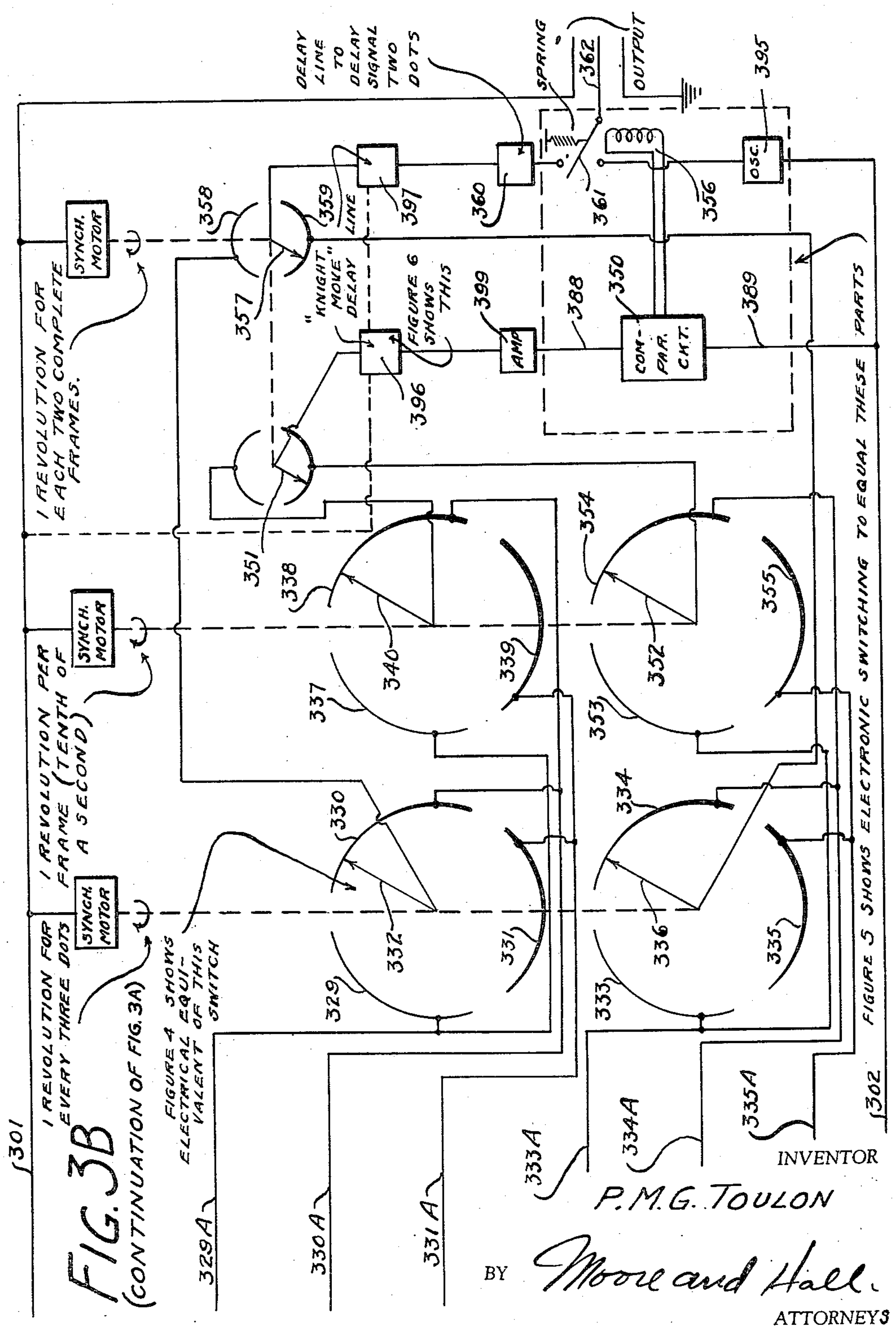

Figures 3A and 3B form a more complete illustration of the receiving station of Figure 1B.

Figure 4:
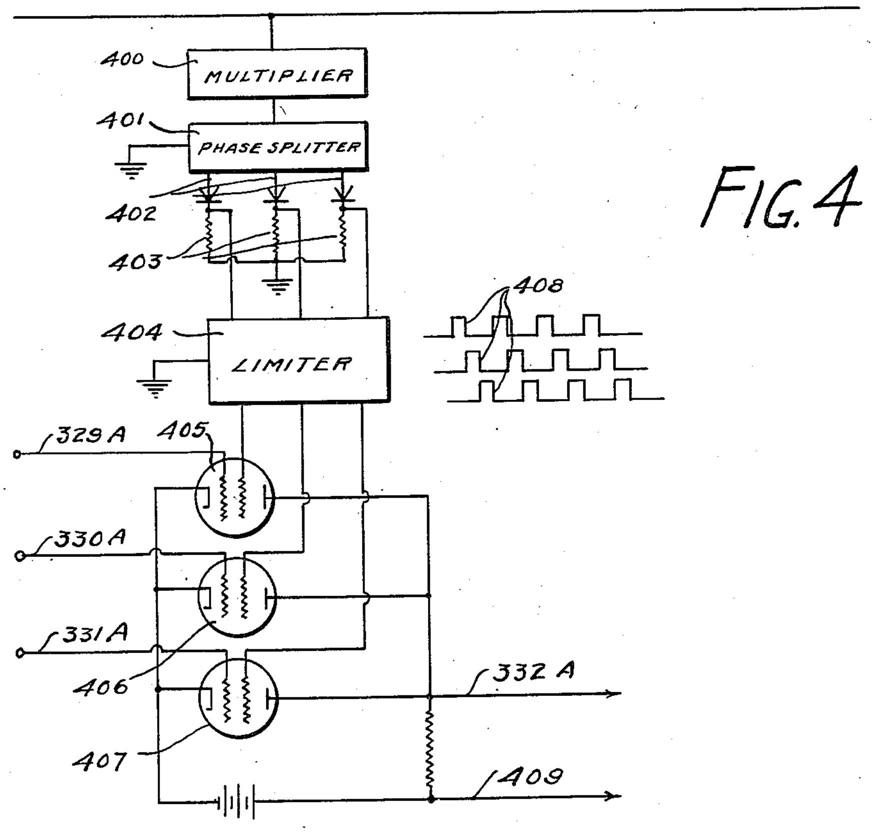

Figure 4 illustrates an electronic switch that may replace switch 336 of Figure 3.

Figure 5:
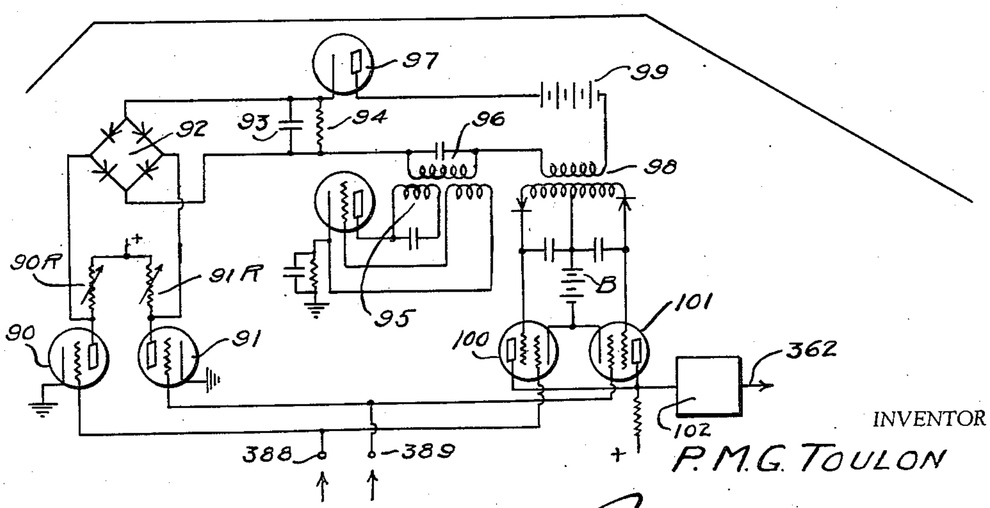

Figure 5 illustrated an electronic switch that may be used as the comparison circuit 350 together with relay 356 of Figure 3.

Figure 6:
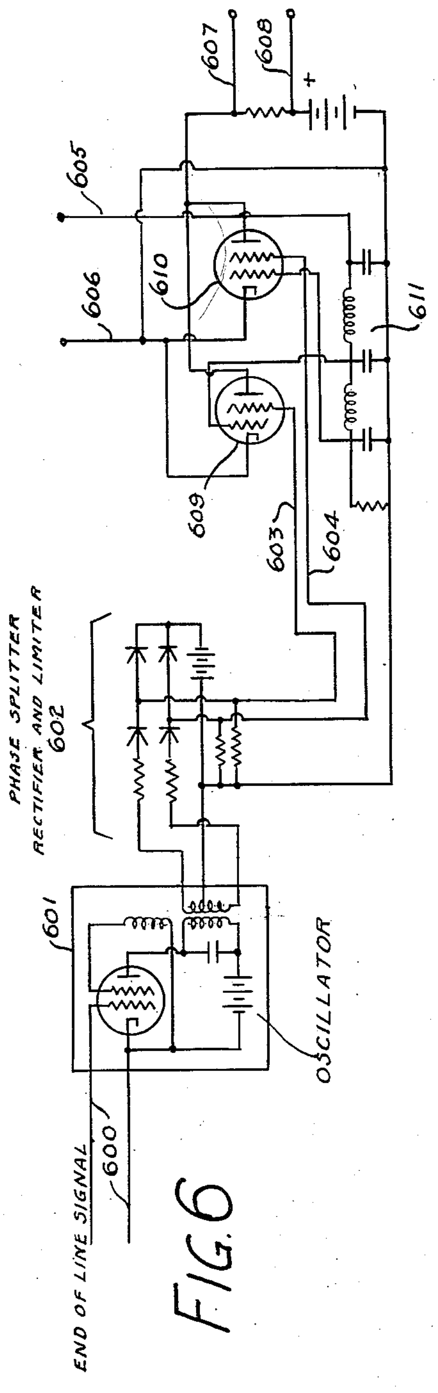
Figure 6A:
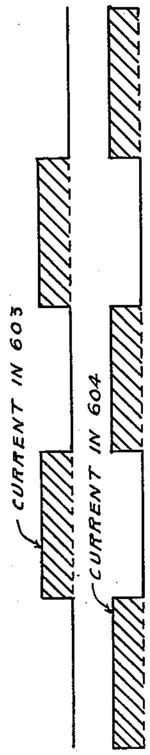

Figure 6 illustrates the circuit of the "knight move" delay lines of Figures 1A and 3. Figure 6A illustrates certain potentials on certain wires of Figure 6.

Figures 2, 7:
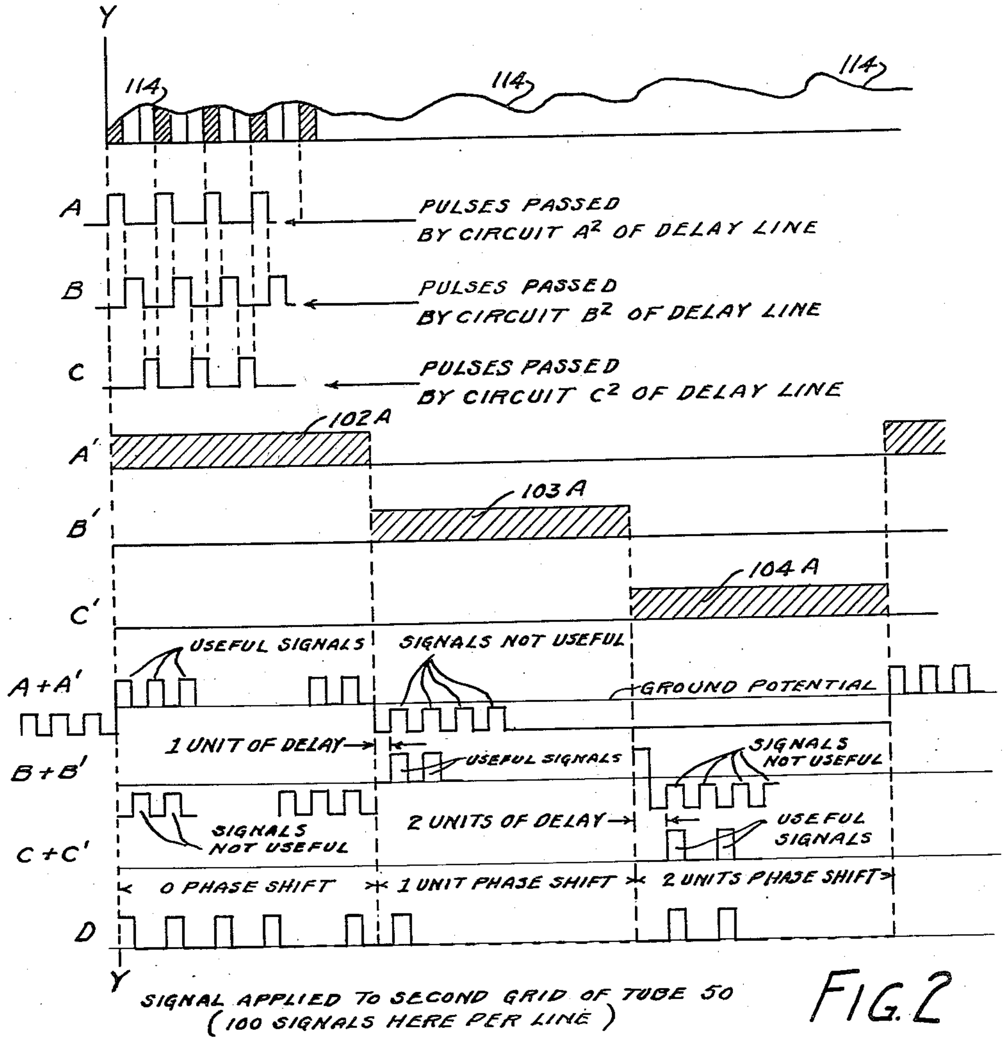
Figure 2 shows curves of the voltages involved at the transmitting station.

Figure 7 shows the face of a cathode ray tube and an order of scanning thereon, when the three dot non interlaced system is used.

Figure 8:
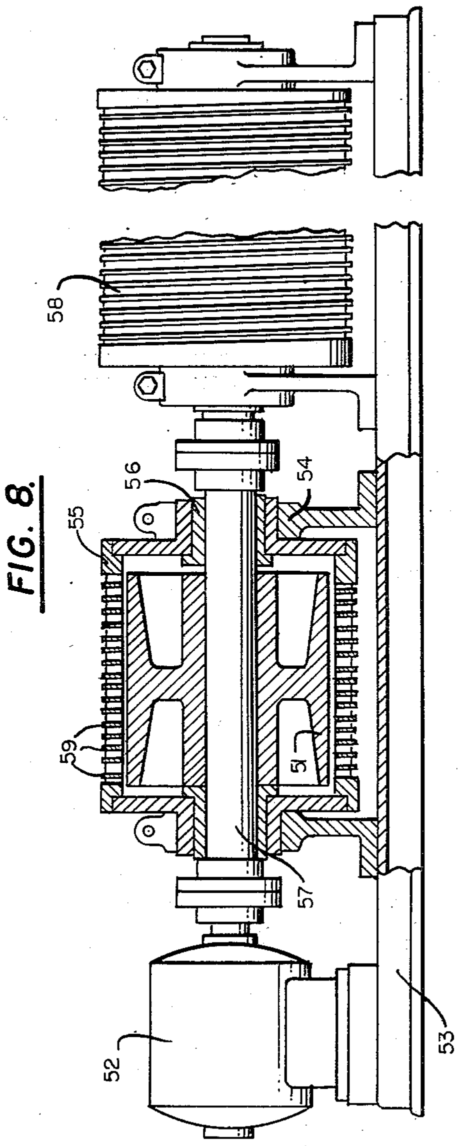
Figure 8B:
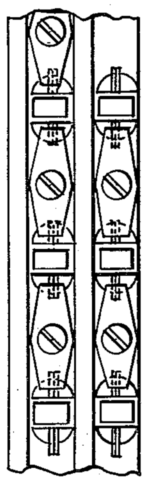
Figure 8A:
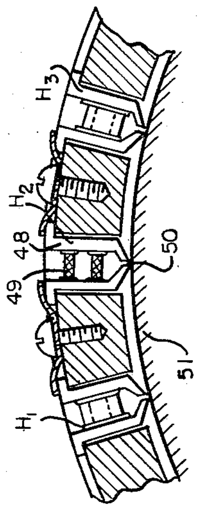

Figures 8, 8A and 8B illustrated details of the recorder of Figures 1B and 3.

Figures 9, 9A:
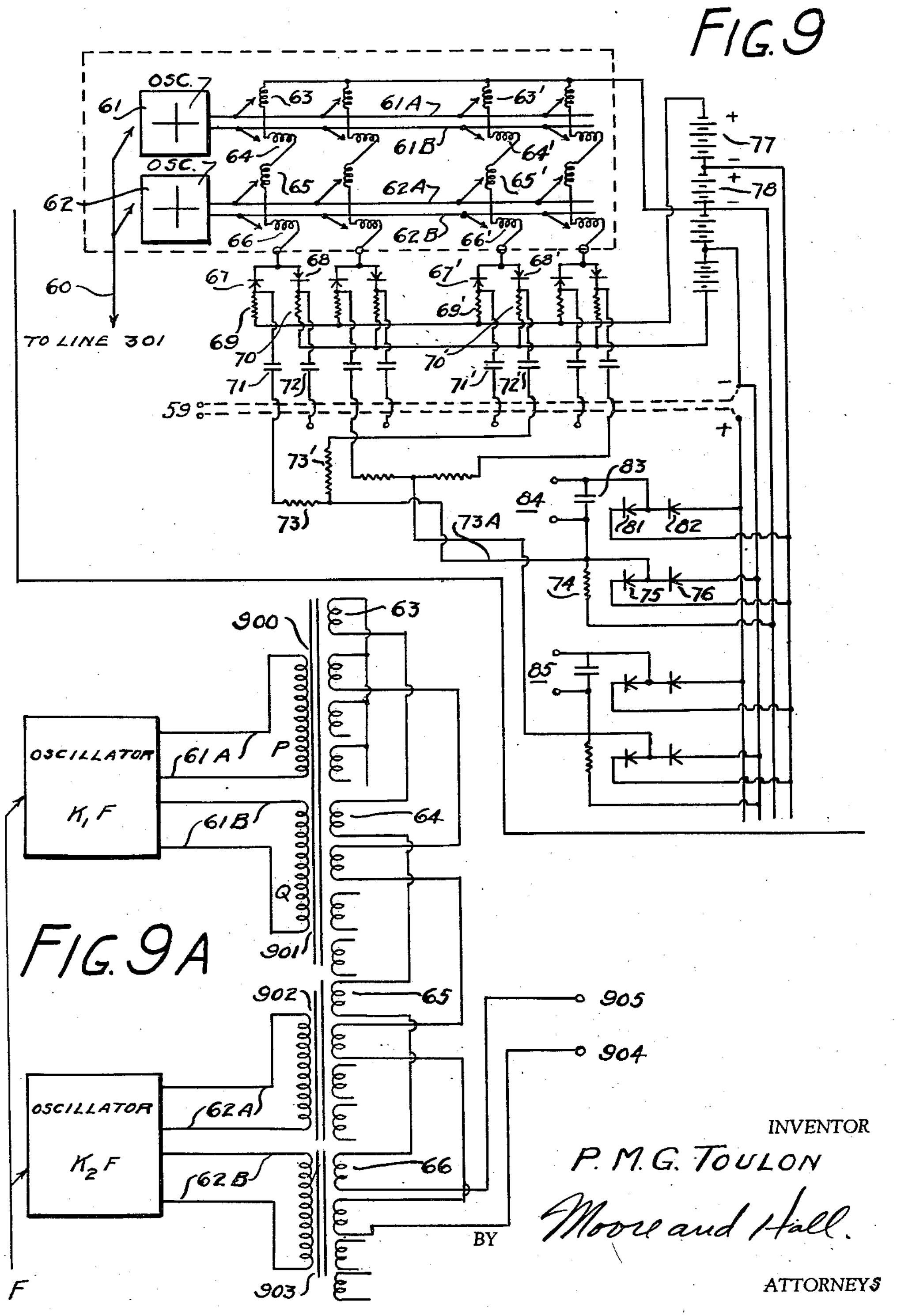

Figure 9 shows an electronic switch that may replace switch 320 (and similar switches) of Figure 3. Figure 9A illustrates certain details of Figure 9.

Figure 10:
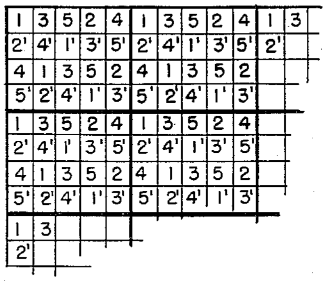

Figure 10 illustrates the checkerboard and order of scanning when the five dot system is used.

Figures 11, 12:
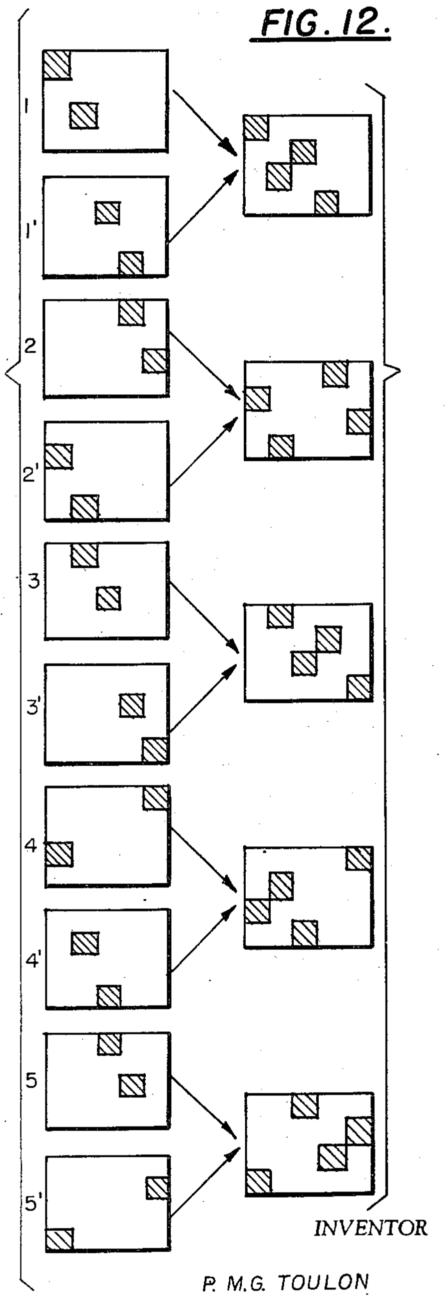

Figures 11 and 12 illustrate the order of scanning of the checkerboard.

Figure 13:
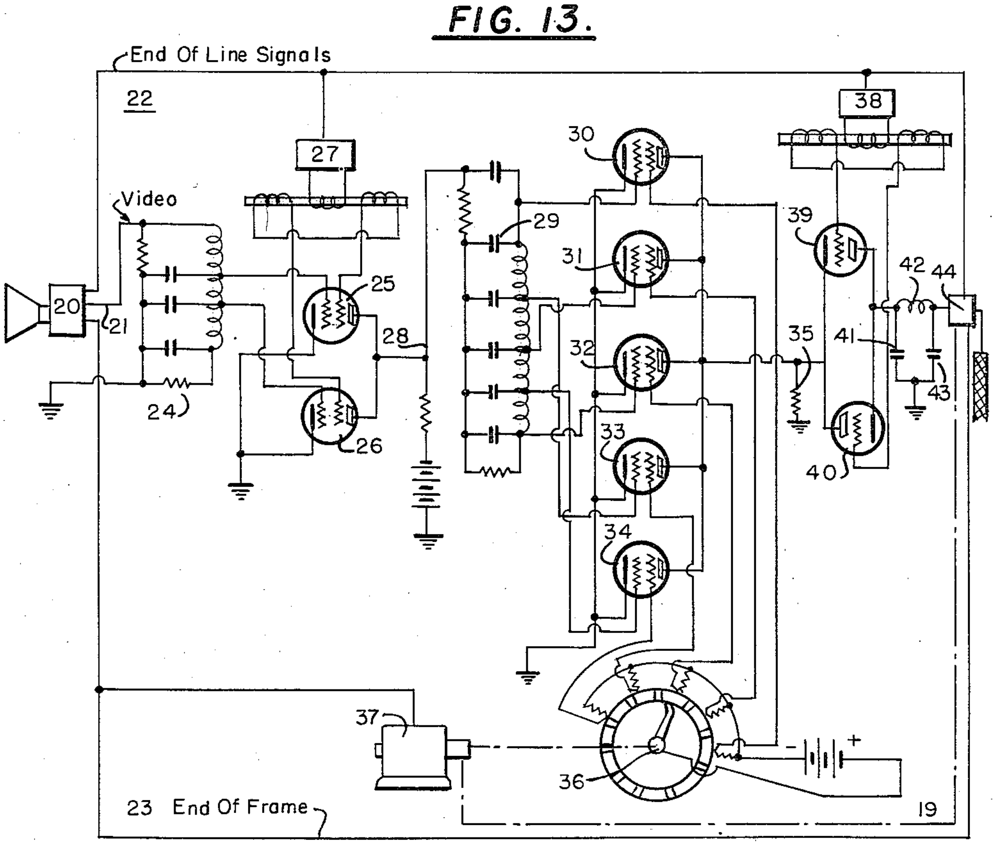

Figure 13 illustrates a transmitter when the five dot system is employed.

Figure 14:
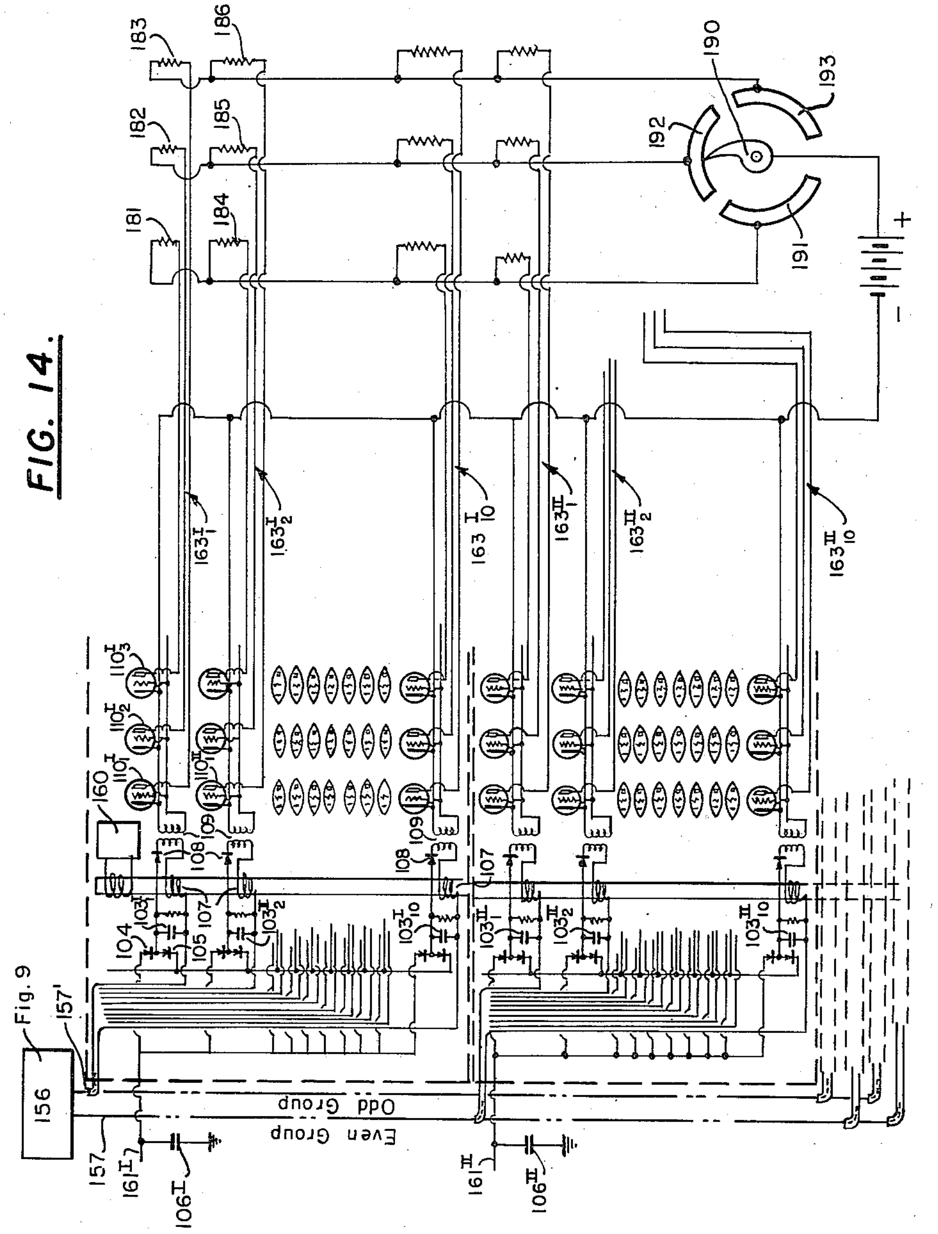

Figure 14 illustrates a system of controlling information to be recorded and convected to the output of Figure 9.

Figure 15:
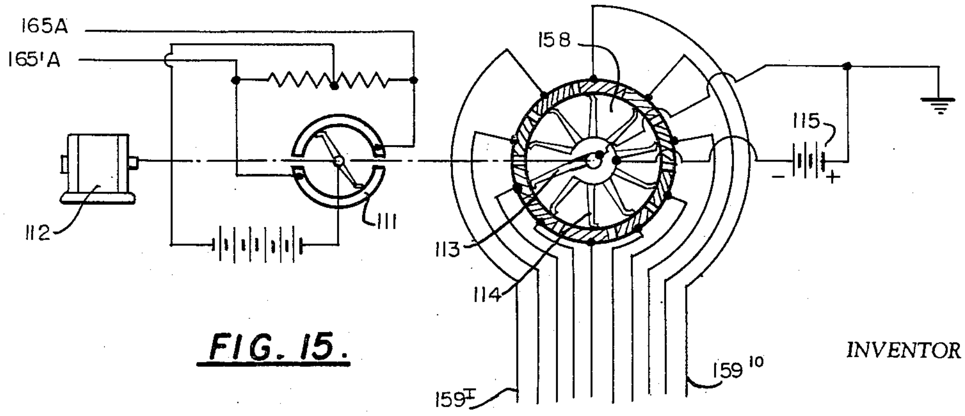

Figure 15 shows a switching system useful in the five dot system.

Figure 16:
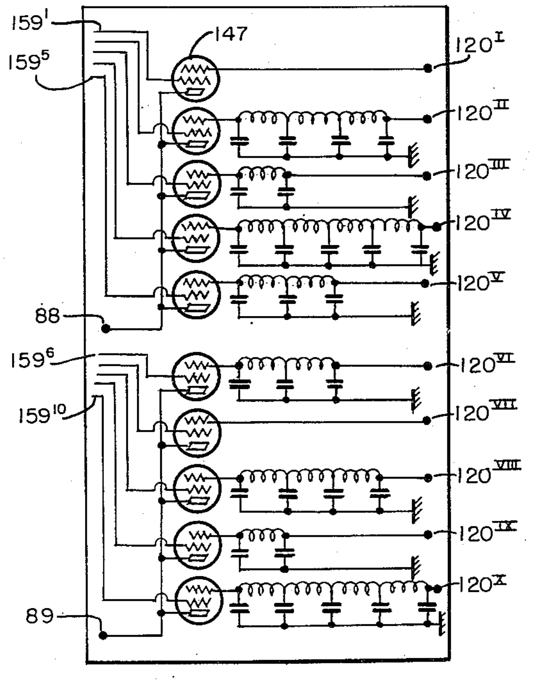

Figure 16 is a circuit of an alternate form of a fine dot system.

Figure 17:
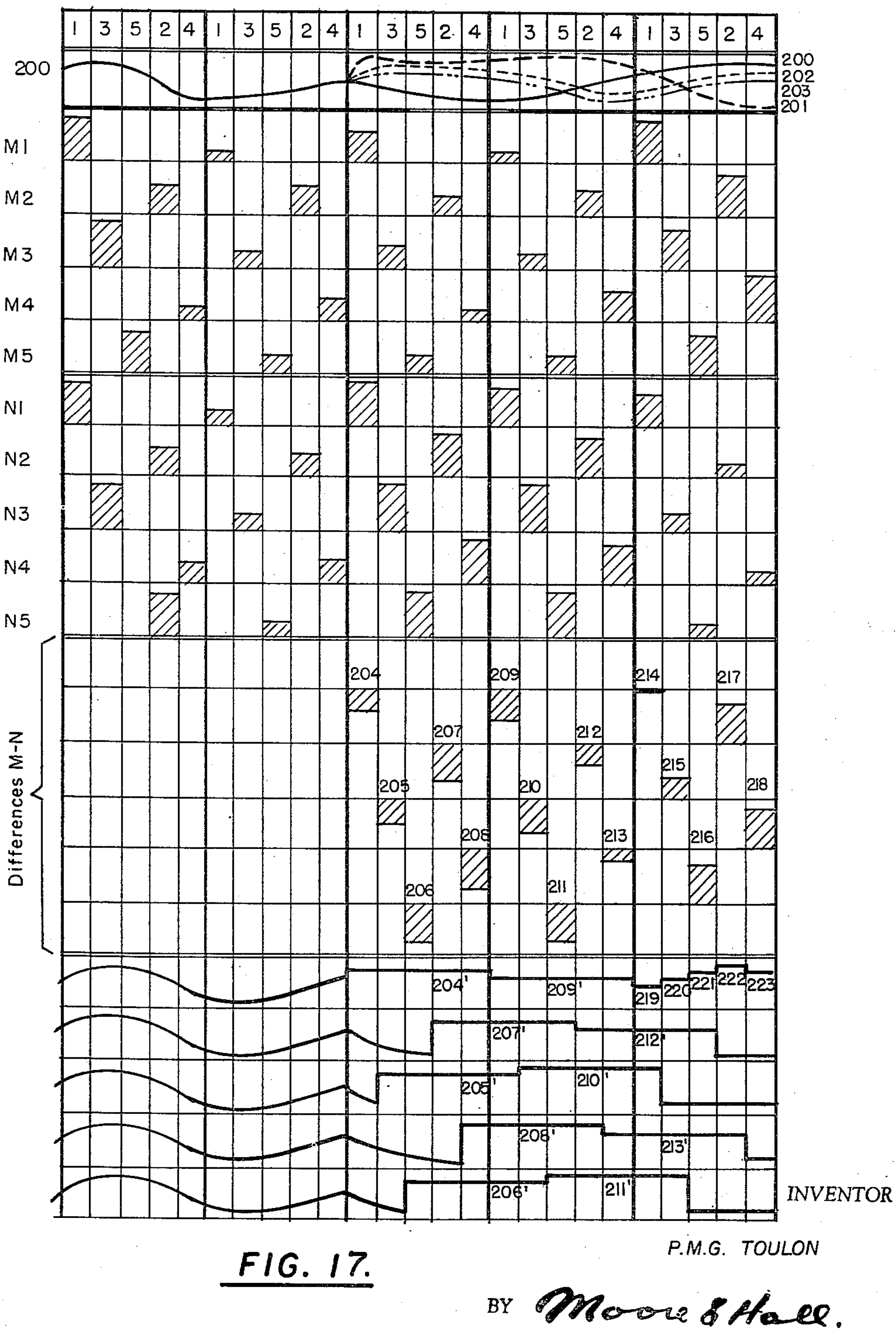

Figure 17 is a chart of certain voltages appearing in the five dot system.

Figure 18:
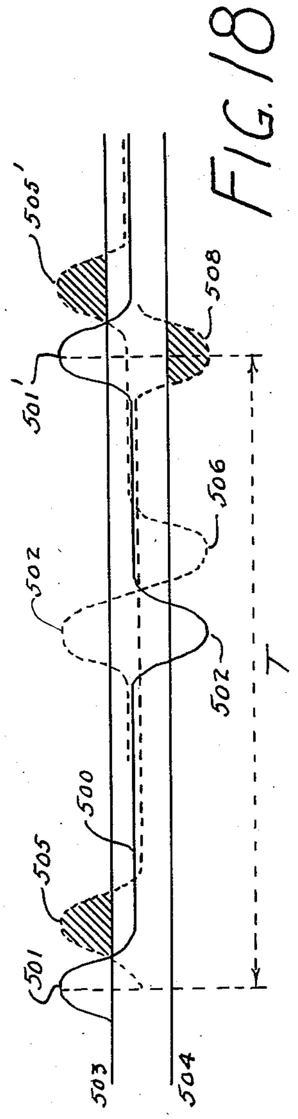

Figure 18 shows certain waveforms explanatory of Figure 9.

The invention will first be described with reference to a system requiring only one-third of the usual bandwidth. Later a system requiring only one-fifth of the usual bandwidth is described.

Referring first to Figure 1, the sub-Figure 1A illustrates the originating station which is connected by a long line (or radio link) with the second or deciphering station of sub-Figure 1B. The details of Figure 1B will be explained with reference to several more detailed figures.

In Figure 1A the usual sixty-cycle per second power line feeds motor-generator 100 having a ten cycle per second three phase output. Limiters 101 limit the output to three rectangular waves A′, B′, C′ (see Figure 2). These rectangular waves do not overlap, but appear successively in time. During the period of wave 102A, the second grid of tube 102 opens this tube to admit current flow, but tubes 103 and 104 are non-conducting. Similarly during the period of wave 103A only tube 103 has its lefthand grid energized, and during the period of wave 104A only tube 104 has its lefthand grid energized. As usually, the end of frame signals and end of line signals are generated separately and synchronised on the classical 60 v. A. C.

Video camera 105 produces video signals across wires 106. The "end of line" signals arriving on wire 107, are multiplied in multiplier 108 and are then fed to pulse generator 109 and lock the latter in synchronism therewith. The output repetition rate of pulse generator 109 is one third of the number of dots in a line. The output pulses of pulse generator 109 are fed into delay line 110. Pulses reaching point 113 are delayed one unit more than those reaching 112 which in turn are delayed one unit more than those at 111. This will be explained in connection with Figure 2. Assume that curve 114 is a plot of the potential of the video signals in circuit 106. The pulses arriving at point 111 and passing in wire $A^2$ to the first grid of tube 102 are designed by letter A of Figure 2. Likewise the signals arriving at point 112 and fed by wire $B^2$ to tube 103 are designated by letter B of Figure 2. Similarly the signals arriving at point 113 and fed by wire $C^2$ to tube 104 are designated by letter C of Figure 2. Each of the tubes 102, 103 and 104 is so constructed and arranged that it will pass current only when both grids are energized. As a result, during the period of wave 102A, the useful signals are $A+A'$ (see Figure 2) and it is noted that the first of these signals adjoins the starting axis $Y—Y$. The other useful signals of this group are spaced from each other by two intervening spaces. Consequently these signals open the second grid of tube 115 only during the cross-hatched portions of curve 114. During the period of wave 103A, the useful signals are shown in line $B+B'$ and it is noted that there is a one unit space between the beginning of period 103A and the first useful signal. This delay is caused by the delay line 110 between points 111 and 112. During the period of wave 104A, the useful signals appear above line $C+C'$ and are spaced by two units from the beginning of period 104A. This spacing is caused by delay line 110 between points 111 and 113. The result of all of the useful signals is shown in line D of Figure 2. Assuming interlaced scanning, the sequence of spots scanned during the period of one cycle of generator 100 is shown in Figure 7, except for purpose of simplification of description the number of units across the picture is assumed to be fifteen and the number of units down the picture is assumed to be ten. Fig. 7 shows a simplified non interlaced picture having only 5 lines of 15 dots, for the purpose to explain the order of the dots successively scanned through the means of circuit Fig. 1A. It is clear that spots 1 through 25 are scanned during the period of wave 102A, spots 26 through 50 during the period of wave 103A, and spots 51 through 75 during the period of wave 104A. The result is that tube 115 has an output of pulses. Each pulse is spaced from the next by two units and the pulses respectively represent spots in the sequence of Figure 7. Since the space between spots is two units, clearly the repetition rate of the output signal is only one third of the conventional output.

So far as the draftsman's notes on Figure 1 and the accompanying description are concerned, the term "entire picture" refers to a scanning that senses every third dot of the whole picture, hence it would take three such scannings to develop one signal for each dot of the picture.

Referring now to Figure 1B, it will be assumed, for sake of simplicity, that interlaced scanning is not employed, but later in connection with Figures 3A and 3B there will be disclosed a receiver for such scanning. In Figure 1B, signal distributor 200 makes one revolution for each entire picture and sends the signals emitted during period 102A to recorder section 201 of a three section magnetic recorder. During period 103A the switch 200 sends the transmitted signals to recorder section 202, and during period 104A the switch 200 sends the transmitted signals to recorder section 203.

After the recorder has made one revolution the pickup 201A picks off signals applied by head 201. Likewise pickups 202A and 203A respectively pick up the signals recorded by heads 202 and 203. More details of the recorder will appear in connection with Figures 3 and 8. Referring now to Figure 7, it is clear that the signal representing spot 1 is the first signal picked up by pick-up 201A. The signal representing spot 26 is the first signal picked up by pick-up 202A, and the signal representing spot 51 is the first signal picked up by pick-up 203A. The signal representing spot 2 is the second signal picked up by pick-up 201A. Therefore, since switch 204 makes one revolution for every three dots, it reproduces the dots in its output circuit in the following sequence 1, 26, 51, 2, 27, 52, 3, 28, 53, . . . etc. Hence the output lead of switch 204 reproduces the top horizontal line shown in Figure 7, and thereafter the other horizontal lines. Hence, while dots are skipped during transmission they have now been restored. If the picture is not moving the output of switch 204 will give true reproduction of the picture. If the picture is moving, some modification in the output is desirable and to provide this modification, switch 205 rotates synchronously with switch 200 and removes a series of pulse signals from pick-ups 201A, 202A and 203A. The signal output of switch 205 is the same as the signal that was fed to switch 200 at a time preceding equal to the time of three entire pictures. Therefore, the output signals of switch 205 will be duplicates of the input signals of switch 200 if the picture is not moving. Under these circumstances, if the comparison circuit 206 indicates that the signals are the same, relay coil 207 is not energized and armature 208 connects switch 204 to output lead 209. If the comparison circuit 206 indicates any difference between the signals on lines 205 and 210, the relay coil 207 is energized and the signal on line 210 is fed to ouput 209.

Each of the mechanical switches and relays may be replaced by well known electrical equivalent electronic circuits to perform the same results. Before discussing possible electronic circuits, a more detailed form of the receiving station (shown in Figures 3A and 3B) will be discussed. The receiving station of Figures 3A and 3B is a three-dot system and is adapted to decipher the output of Figure 1A.

In Figure 3A synchronous motor 303 makes one revolution for each frame (one each tenth of one second) and rotates switches 304 and 308 at that speed. Motor 303 is controlled by synchronizing signal line 301 which in turn obtains control signals from terminal box 300. Switch arm 305 is geared to switch arm 304 and rotates at half the speed of switch arm 304.

Input lead 302 carries the video-signals and feeds switch arm 305. Switch arm 305 contacts element 306 during scanning of one complete frame of the picture and contacts element 307 during scanning of the next complete frame of the picture. Switch 304 causes the impulses representing the first picture to be recorded on recorder 321 and switch 308 causes the impulses representing the second complete picture to be recorded on recorder 322. During the period that switch arm 304 contacts member 310 (during alternate revolutions) the pulses from spots 1, 2, 3, 4, 5, 6 . . . etc. (of Figure 7) are transmitted to switch arm 315 until every third dot of the picture has been sent. If we assume a picture with 300 picture elements on each line (instead of the fifteen shown in Fig. 7), then switch 315 must have 100 stationary contact points on its periphery, and each stationary contact feeds a separate recording head 315H on recorder 321. After every third dot of each odd horizontal line is recorded by switch 315, switch arm 304 moves to contact element 311 during the period of transmission of the second, fifth, eighth, eleventh, etc. dots of each horizontal line. In the illustration of Figure 7, the switch 316 would cause spots 26, 27, 28, 29, 30, 31, 32 . . . 36, 37 . . . 41, 42 . . . etc. to be sent to recording head 316H. Switches 316, 317, 318, 319 and 320 are all identical to switch 315 and to each other. They may all be electronic switches if desired, and Figure 9 shows a suitable electronic switch to replace these. Reverting back to switch 316 it has 100 contactors which supply 100 recording heads 316H disposed along recorder 321. In like manner when switch arm 309 is contacted by arm 304 and the remaining dots of the horizontal lines are sent to switch arm 317 which sends them to 100 separate recorder heads 317H. During the time required for the various recordings on recorder 321, the recorder makes 3 revolutions, and no further recordings are made on the recorder 321 until after the next complete picture is recorded on recorder 322.

After the data for the first picture is recorded, switches 308, 318, 319, and 320 proceed to record all of the data for the second complete picture in the same way that their complementary switches 304, 315, 316, and 317 recorded the data for the first complete picture lines. When this has been done it is clear that the recorder has one recording for each possible picture element and will have a true representation of the picture if it be assumed that the picture was not moving.

The pick-up heads are shown on the right hand sides of recorders 321 and 322 for purposes of illustration only. In fact, I use a common head to record and to pick-up data. This can work for the following reason. The first picture is recorded on drum 321. The second picture is then recorded on drum 322 and during this recording there is no recording made on drum 321 but the switches 323, 324, 325, 340, 332, are in such position to feed off any signal picked-up from recorder 321. Hence, when a signal is being recorded on one of recorders 321 or 322 the other one is free for pick-up operations. After each pick-up operation an erasing means (not shown) is caused to operate by appropriate switches to erase the recorder. One complete frame after a recording by head 315H the recording is picked up by complementary head 323H and routed through switch 323 to contactor 337. The same is true for all of the recordings that passed switch 315. The recordings made by switches 315, 316, 317, 318, 319 and 320 are all picked-up one complete frame later and are respectively routed by switches 323, 324, 325, 326, 327 and 328. The recordings routed by these switches are respectively sent to switch contactors 337, 338, 339, 353, 354 and 355. During scanning of even numbered pictures (second, fourth, etc.) switch arm 351 connects line 388 to switch arm 340 and during scanning of odd-numbered pictures (first, third, etc.) switch arm 351 connects line 388 to switch arm 352. Switch arm 351 rotates at the same speed as switch arm 305 and as a result the signals fed to line 388 are identical to those fed one complete frame earlier into switch arm 305. The comparison circuit 350 compares the signals in line 388 which represent one frame with those in line 389 which represent signals transmitted at one complete frame thereafter. If the comparison circuit indicates no change in the signals, the relay coil 356 is not energized and the recorded signals are delivered to the output. If on the other hand, the comparison circuit 350 indicates a change, the relay coil 356 attracts the armature and connects the line 302 to the output circuit.

It is observed that switches 332 and 336 make one revolution for every three dots or units. It will appear from Figure 7 that to produce the first horizontal line it is necessary to scan dots 1, 26, 51, 2, 52 etc. in that order. Dots 1, 2, 3 etc. appear successively on contactor 329. Dots 26, 27 etc. appear on contactor 330, and dots 51, 52 etc. appear on contactor 331. The requirement is therefore to select dots sequentially from these three contactors. Switch arm 332 which makes one revolution every three dots does just that and produces a pulse output with pulses in the sequences shown by the horizontal lines of Figure 7, except of course there are 300 horizontal dots in each line instead of fifteen as shown in Figure 7. Likewise switch arm 336 which cooperates with contactors 333, 334 and 335 produces a pulse output for the even horizontal lines. Switch arm 357 makes one revolution for each two complete frames and is in contact with contactor 358 while odd numbered pictures are being scanned and is in contact with contactor 359 during scanning of even numbered pictures. Therefore, the switch arm 357 receives a complete picture of interlaced scanning but displaced one complete picture in time. When, therefore, relay coil is not energized, the picture sent to the output is a complete one in every respect of the still object being televised. When the picture is moving, the relay coil is energized from time to time and modifies the still picture.

When a picture is still the eye requires a fine reproduction otherwise the picture will appear incomplete. When the picture is moving the eye requires much less detail in the reproduction and the coarse signal fed over line 302 (equivalent of the wire 210, Fig. 1) is quite sufficient. The reproduction can be improved if a delay line 360 is inserted in the output of switch 357. This delay line delays the signal by two or three dots so that the coarse signal on line 302 actually begins to show up the change before it appears to occur. The relay coil 356 may, if desired, have a lag of one or more dots so as to cut off all signals coming through line 360 as long as the picture is moving. In addition an oscillator 395 may be connected to the output and be triggered by line 302 to supply two more dots to the output when the relay 361 is down.

Figure 4 illustrates an electronic switch to replace mechanical switch 332, and a similar switch may of course replace mechanical switch 336. In Figure 4 an oscillator 400 has its frequency controlled by synchronizing signal 301 and oscillates at a frequency of one cycle for every three dots. Phase splitter 401 converts the single phase to three phase and the latter is rectified in rectifiers 402 and impressed across resistors 403. The rectified half wave three phase is then passed into limiter 404 to produce the square wave output forms 308 having non-overlapping rectangular pulses. This can be accomplished by selecting the proper degree of limiting action. Tubes 405, 406 and 407 are non-conductors until their second grids receive a positive impulse. Hence, the tubes 405, 406 and 407 are activated sequentially by the rectangular pulses. Therefore the circuit sequentially connects leads 329A, 330A and 331A to output lead 332 A. The last four leads mentioned correspond to similarly marked leads on Figure 3.

When it is desired to use electronic switching in place of relay 356, the comparison circuit and the relay coil can take the form shown in Figure 5. Input 388 of Figure 5 is wire 388 of Figure 3 and input wire 389 is wire 389 of Figure 3. Output wire 362 of Figure 5 is the corresponding wire of Figure 3. Input signals 388 and 389 are applied to the grids of tubes 90 and 91. The plates of these tubes are connected to resistors 90R and 91R. These resistors are variable in order to aid in balancing the circuits so that when a still picture is televised the outputs of tubes 90 and 91 will be equal. These ouputs are applied across full wave rectifier 92 so that if there is any difference between the outputs of 90 and 91, a potential will appear across condenser 93 and resistor 94. An oscillator 95 generates a high frequency carrier wave which is impressed on secondary 96. In the absence of potential across resistor 94 the second grid of tube 100 is biased positive by battery B whereas the second grid of tube 100 is not biased. This causes tube 100 to become conductive and to be triggered by the signal from line 388. Hence, the output on line 362 is controlled in accordance with the output of the recorder. When inputs 388 and 389 differ, a potential appears across resistor 94 which adds to that on secondary 96 and battery 99 and causes current flow in rectifier 97. This current passes through the primary of transformer 98 and sets up two secondary currents which are both rectified and one of which biases tube 100 to cut-off and the other of which biases the second grid of tube 101 so it will be controlled according to the variations on its first grid. Therefore, variations on line 389 will control the first grid on tube 101 which will in turn produce variations in line 362 according to those on line 389. An appropriate output amplifier 102 may be employed.

The foregoing discussion has ignored the "knight move" delay line found in both the sending and receiving station. Considering a "knight move" to be a true one such as in a game of chess, such a move cannot be fully accomplished in my three dot system just described, but can be achieved fully in the five dot system to be described later. However, with the three dot system an inferior form of "knight move" can be achieved in which half of the moves will be true knight moves and the other half otherwise.

The "knight move" delay lines of Figures 1A and 3B are identical and are triggered by "end of line signals." The circuit of such a delay line is so arranged that every other "end of the line signal" places the delay circuit in operation and delays the signal a small amount, whereas the intervening "end of line signals" do cause less if any, signal delay. Figure 6 illustrates the circuit for the "knight move" delay lines.

In Figure 6, end of line signals 600 feed oscillator 601 and cause the latter to oscillate at a frequency of one-half the repetition rate of the "end of line signals." The output of oscillator 601 is fed into phase splitter and limiter 602 which produces a two phase rectified output shown in Figure 6A. The repetition rate of the pulses in wire 603 is one pulse for every other line. The same may be said for wire 604. The group of pulses in wire 603 is out of phase with the group in wire 604. Input wire 605 may connect to switch arm 351 in the case of "knight move" 396 (Fig. 3B) and may connect to switch arm 357 in the case of "knight move" 397 (Figure 3B). In the latter case input 606 will connect to wire 409 (see Fig. 4) and will connect to the return lead from the pick-up heads in the case of "knight move" 396. When the "knight move" of Figure 6 is applied to Figure 1A, input wires 605 and 606 of Figure 6 may connect across resistor 186 of Figure 1A, and wire 600 of Figure 6 connect to wire 107 and to ground respectively of Figure 1A. The output leads 607 and 608 of Figure 6 are applied to the second-grid to cathode circuit of Figure 1A. In Figure 3B, the output leads 607 and 608 of "knight move" 396 feed amplifier 399, and the output leads of "knight move" 397 feeds delay line 360.

In Figure 6 each of the two tubes 609 and 610 is non-conducting except when receiving a pulse on its second grid. During the period of a pulse on wire 603, tube 609 is conducting and tube 610 non-conducting. During this period the incoming signals on wires 605 and 606 encounter only the first section of delay line 611 and hence are delayed only slightly. During the period of energy on wire 604, only tube 610 conducts and this causes the energy on input 605, 606, to have a two stage delay before reaching the grid of tube 610. Hence, if we assume interlaced scanning, during the scanning of line 1, tube 610 will be open and only a small delay will be encountered. Due to interlaced scanning, line 2 will be skipped and hence line 3 will next be scanned. All of the dots on line 3, will, however, be displaced to the right as compared to those on line 1, due to the full effect of delay line 611. Hence, on alternate lines scanned complimentary dots will be displaced from each other instead of being in vertical lines.

Figure 8 shows details of the recorder. A base 53 of heavy stock supports synchronous motor 52 which drives shaft 57 that is arranged for very accurate rotary motion with bearing 56 supported by frame 54. The smooth accurately machined cylinder 51 of magnetizable material and suitable for storage of signals is rotated by shaft 57 and constitutes the recording surface. The recording heads $H_1$, $H_2$, $H_3$, etc. are disposed around the periphery of the cylinder, but since their support 59 is in the form of a helix the heads are actually spaced short distances axially along the cylinder. The result is that a large number of recording heads can operate on a single cylinder without interference. The left-hand recorder of Figure 8 is shown as a sectional view whereas the right-hand recorder of Figure 8 is shown as a side view. The right hand recorder clearly shows the helical arrangement 58 of the recording heads. Figures 8A and 8B show details of the recording apparatus. Each recording head has the usual magnetic circuit and coil. A suitable recorder is shown in my prior Patent 2,471,253.

Figure 9 illustrates an electronic circuit which will replace any one or more of switches 315 to 320 or 323 to 328. Line 60 of Figure 9 is connected to synchronizing signal wire 301 and excites two oscillators 61 and 62 which respectively have frequencies KF and CF where F is a common basic frequency. Each oscillator has an output in phase quadrature with another of its outputs. For example oscillator 61 furnishes line 61A with voltage in phase quadrature with the voltage in line 61B, all at frequency KF. Likewise oscillator 62 furnishes line 62A with voltage in phase quadrature to that in line 62B. As shown in Figure 9A, output line 61A feeds the primary of transformer 900. Likewise line 61B feeds the primary of transformer 900. Likewise line 61B feeds transformer 901, line 62A feeds transformer 902, and line 62B feeds transformer 903. Each transformer has 100 secondary windings only four of which are shown. The phase of the voltage on terminal 904 depends on the amplitude and phases of the voltages on the four secondaries 63, 64, 65 and 66. Likewise the phase of the potential on terminal 905 depends on the potential and phases of the four transformers that feed it. Since switch 320 has 100 output leads successively energized, it is obvious that there should be 100 secondaries on each transformer of Figure 9A. The numbers of turns on the several windings in each circuit are so related that the voltages in the 100 leads rise to their peaks in given sequence and so that the process repeats itself with the first output reaching its peak in sequence after the one-hundredth one reaches its peak. Each output lead (such as 904 for example) has biased rectifiers to act as limiters and thus produce pulsed outputs for those portions in excess of the bias of the limiters. Assuming this bias to be near the peak value of the voltage wave, the outputs will be discrete pulses not overlapping in time.

The upper ends of the secondary windings of transformer 900 are all interconnected. To complete the first circuit 904 there is a connection through the 50th transformer as shown as 63', 64', 65', 66', 68', 72', 73'. The potential outputs of the circuit having both of these transformer groups combines and is fed to the top end of resistor 74. Once each cycle, therefore the rectifiers 75, 76, 81 and 82 are caused to conduct from input 59 to output 84. Output 84 leads to one recording head. Output 85 leads to the next recording head and so on until all 100 of the outputs like 84 and 85 have been connected to their respective recording heads. Input 59 corresponds to lead 59A in the case of switch 315 (Fig. 3). To summarize Figure 9 it may be said that the arrangement is such that the phases in 100 different circuits are spaced so that the voltages in those circuits rise sequentially, and those 100 circuits trigger 100 output circuits in sequence to connect the input to the output. Vacuum tubes with grids may be substituted for the rectifiers of Figure 9, and in this case leads such as 73A would trigger the grids to connect the input (cathode) to the output (anode) in the well known way.

Figure 10 shows a checkerboard arrangement of the scanning dots for a five-dot system. In this system only one of every five dots is transmitted instead of one of every three as in the case of Figure 1. In Figure 10 the whole checkerboard is divided into smaller checkerboards of twenty-squares each. Figures 11 and 12 show the order of scanning of each of the checkerboards. Moreover the numbers on the squares in Figure 10 show the order of scanning with the primed numbers showing the order during interlaced scanning sweeps.

For the particular application, I use preferably a "knight's move" dot interlaced scanning as described in my Patent 2,479,880; according to the invention the points of the picture are divided in a certain number of checker groups for example $$\frac{525}{4}=131$$

in vertical direction and for instance $$\frac{500}{5}=100$$

in the horizontal direction. As described in Figure 10 each checker group comprises for instance 4 points in the vertical direction and 5 in the horizontal direction.

The preferred order of exploration is described below in ten successive fields as shown in Fig. 11 and after which the cycle begins again.

The first scanning of screen odd lines uses all the points marked 1 in the first location in the first line, all of the points marked 1 on the third line and so on alternately for all the odd lines of the first field.

The second scanning of screen, even lines, uses the third location of the fourth line for point 1' and alternately for all the lines of the even numbered field.

The third scanning of the screen odd field, odd lines uses for points numbered 2 at the fourth location at line one and the fifth location at line three and so on alternately for all odd lines of the third field.

The fourth scanning of the screen even lines uses point numbered 2' at the first location of the second line and the second location of the 4th line and so on alternately for all odd lines of the fourth field. And so on as shown in Figures 10 and 11.

In this fashion ten successive scannings of the screen are required to cover all the points of the screen. According to the classical standards a $2\times5$ interlaced line scanning is used so the respective positions of the points are visible in Figure 2. It appears that a time of $^{10}\!/_{60}=^{1}\!/_{6}$ of second lapses between two successive samplings at each point of the high definition picture. According to the invention only the points chosen for sampling are transmitted in a greatly reduced number.

As a result this new scanning process requires only the transmission $^{1}\!/_{5}$ the number usually sampled that will be about 1,500,000 video signals per second. For the transmission of color it appears that a 3 megacycle band width of the coaxial cable is largely sufficient to retain both high definition and correct coloring of the picture, a thing which is impossible with the band width now in use.

The invention has the property of rebuilding at each station, a video classical channel of high fidelity that does not much differ from the initial intelligence of the electronic camera at the initial station and ready to be locally retransmitted to home receivers.

In Figure 13, 20 is the high definition electronic camera, 22 the channel for the end of line signal, 23 the channel for "end of image signal," 21 the video channel.

As we observe the frame of Figure 10, the order of the third line 41352 is shifted by one unit in the order of the first line 13524. In order to obtain this phase shift after the end of each line the invention provides two tubes 25 and 26 alternately operated through oscillator 27 synchronized on half frequency of the "end of line signal" received through the channel 22. These tubes have two control grids. The first grid being connected to different terminals of artificial line 24 and the second grid is biased or unbiased at the frequency of oscillator 27.

The plates of the two tubes are connected in parallel and to wire 28.

In order to modify the order of the points to be scanned, in the following fields, a second artificial line 29 is provided. The delay line 29 supplies the first grid of a bank of tubes 30, 31, 32, 33, 34. The second grids of this bank of tubes are normally biased or locked and they are successively unlocked at the frequency of the successive fields through the means of a commutator 36 driven through a small motor 37 synchronized in 23 so that one turn corresponds to ten successive fields. The plates of the tubes are connected in parallel. Consequently for each field only one of the tubes 30 to 34 is unlocked supplying the output resistor 35 with successive voltages corresponding to the chosen order.

A further improvement in the invention provides accurate constant values for each successive point through the means of tubes 39 and 40. In order to facilitate the transmission of the video signals through the narrow band coaxial tube, it is highly desirable that the individual values successively sampled on channel 35 are not separated but are connected one to the other without periodic interruptions. For this purpose, I provide the use of tube 39 to charge a condenser 41 and another tube 40 to discharge it with a timing operated by heterodyne 38 synchronized through appropriate multiplier at a frequency of the points of the picture.

Each tube operates only during a very short time and consequently the condenser receives successive voltage steps having very accurate values in duration and amplitude. Damping devices 42 and 43 are provided to reduce the transition time between each step.

The video small band channel is mixed in 44 with the end of line signal 22 and end of picture signal 23 and also a special signal on wire 19 to identify upon arrival the numeral of the field in the group of ten fields. Further identification means are required for correct color transmission.

In order to lay a groundwork for explanation of Figure 14, I will give another explanation of Figure 9, in the light of explanatory Figure 16.

Figure 9 shows how is made the distribution of the successive impulse arriving in the common channel 59, into a multiplicity of independent channels 85, 86, etc.

Synchronizing pulses of different form or amplitude are generally sent also in the same channel (namely the end of line signals). The cadency of this signal is F. After separation, these signals are used in the channel 60 to synchronize a multiplicity of oscillators 61, 62 having frequency $K_1F/K_2F$ having F as common basic frequency. These oscillators generate voltages in phase and in phase quadrature. Namely oscillator 61 after amplification, furnished the line 63 with phase voltages, and line 64 with phase quadrature voltages, at frequency $K_1F$.

In the same manner, oscillator 62 generates in line 65 voltages in phase and line 66 voltages in phase quadrature at frequency $F_2$. The four phase and quadrature voltages are fed to the primary of four transformers having a great number of independent secondary windings.

The number of turns of the transformer secondary windings are in accordance with the amplitude and phase to be obtained in each coil 66.

According to my prior Patent 2,471,253 I obtain in a number of terminals 66 . . . $66^1$ . . . surges of voltage successively appearing in course of time.

The successive surges of voltage are isolated respectively for the positive surge by means of rectifier 67 and resistor 69 and for the negative surge by means of rectifier 68 and resistor 70.

With an appropriate choice of the phase and amplitude of the different individual sinusoidal voltages at terminal 66 it is possible to phase shift the positive surge and the negative surge so that the time between the two surges is an appropriate fraction $$T=\frac{1}{F}$$

of the recurrence period in each channel. In this particular case where $K_1$, $K_2$ are odd numbers because of the symmetry of the curve, the negative surge and the positive one are at a time delay of $$\frac{T}{2}$$

The positive surge is used, through the means of condenser 71 and resistor 73 and the negative surge is used through means of condenser 72′ and resistor 73′.

The amplitude of the surges are shaped to an accurate value by means of a voltage drop in resistor 74.

The positive surge is limited through means of a polarized rectifier 75, and the negative surge is shaped by the means of a second polarized rectifier 76.

Therefore on resistor 74 quasi rectangular pulses of very accurate value appear successively.

The positive pulse is used for introducing (storing) the first signal in condenser 83 and in the individual first channel 84 leading to a group of magnetic recorders. The negative pulses are used for the discharge of condenser 83.

In the same manner, the other terminals 66 of the circuit within the dotted frame are used to operate the other channel as 85 . . . which are 100 in Fig. 12.

The pulses arriving through terminals 66 etc. being time phase shifted one with another the successive signals arriving from the common channel 59 are distributed in turn to each individual channel 84, 85 . . . etc.

As it is illustrated, two independent leads of the complex voltage distribution (dotted frame) as 66 and 66′ in the case of Figure 9 are used simultaneously for the activation of the same independent channel 84.

This permits to choose the shifting between the introduction of charge and the discharge at a value different from $$\frac{T}{2}$$

Namely it permits the use of symmetrical complex voltage curves to obtain a duration for storing the charge in the condenser that is only a fraction smaller than T.

The explanation of this improvement of the invention appears on Figure 22.

The symmetrical complex voltage of terminal 66 is shown in 500 with a positive surge voltage 501, 501′ and a negative surge of voltage 502 disposed in the middle and of opposite directions to the two positive surges. Between lines 503 and 504 lay the unused portion of the curve because of polarization of rectifiers 67 and 68.

For the following terminal 66′ phase shifted from the first, the same phase shifted complex voltage is shown as a dotted line. The positive surge is 505, 505′ and the negative 506 in the middle.

The other complex voltage of the other terminals are not shown on the scheme, but only the terminal corresponding to the $$\frac{N}{2}\text{th}$$

terminal in "dot and hatched" line in terminal 66′.

The positive surge is 507 and the negative 508 for this $$\frac{N}{2}\text{th}$$

terminal.

The time $T=1/F$ corresponds to the distance between two successive surges of same direction of the complex curve namely the distance between 501 and 501′.

When the same complex curve is used for the storing of signal in the capacity (namely surge 501) and for the discharge (namely surge 502) the time of maintaining the charge in the condenser is only $$\frac{T}{2}$$

But, according to the present improvement one uses simultaneously a positive surge as 505 and a negative surge as 508 corresponding to the location of a terminal 66′ equal to $$\frac{N}{2}-1$$

the duration of the storing is increased to the total line T less a small fraction.

Another feature of the invention further provides a first distribution from the common video channel into 100 independent recorders for each frame and a second distribution for 6 successive frames when the three dot system is used.

In order to distribute between 100 channels the signals coming from the common video channel, it is preferred to use a double stage of distribution shown in Fig. 14.

A first step is operated between 10 independent intermediate channels and then each intermediate channel is successively divided into 20 final channels.

The first stage of distribution between 10 channels is made in accordance with my Patent 2,471,253 that is the repartition between the 10 channels numbered $161_1$, $161_2$ . . . $161_{10}$ in Figure 14.

According to the invention one uses for the second stage of distribution a pulse generator 156 successively positive for the storing and negative for the discharge as explained in Figure 9 and explanation Fig. 18.

The invention provides two groups of conductors 157 and 157' of 10 in each group with signals that are phase shifted from one group to the other, and which are used alternatively for each of the 2 groups.

According to my patents, condensers $106_1$, $106_{II}$, arc $106_{10}$ are provided on each of 10 channels of the first distribution.

These condensers have for effect to prolong the action of the signal in the individual intermediate channel 161 at each time there are several conductors in which the voltage is in course of changing because of the first step commutator and the second distribution can not be operated simultaneously for all the intermediate channels.

According to the invention, the second step distribution is made alternatively on the odd group of five channels in the 10 channels $161_1$, $161_3$, etc. and alternatively on the even group of 5 in $161_2$, $161_4$, etc.

According to the invention, the second stage distributor is alternately operative on the first group through the impulses arriving via 157 and on the second group through the impulses arriving via 157'; the operation is very accurately operative because at the time of the second stage repartition the 5 intermediate conductors definitely have the correct voltage stored in condensers 106. The switching in the primary distributor takes place while the other 5 intermediate channels are not in use.

As explained in Figure 14, the storing of condenser $103^1$ is obtained through the means of rectifier 104 and the discharge is obtained before the end of time T at appropriate timing through the means of impulses coming from generator 156 through the means of a second rectifier 105. These two operations follow in alternate order.

According to Figure 14 this process has also an adtional advantage, as it has been explained in Figure 9. It is difficult to obtain in the independent channel as 84, 85, etc. voltages that have a stabilized value by comparison with ground.

In order to provide in Fig. 9 the equivalent of a common conductor for 84 and 85 and etc., I provide a high frequency type of coupling.

According to the invention, Figure 14 the voltages stored in the 100 condensers $103_1^1$, $103_2^1$, etc., are used for modulating a high frequency supply of power. This power is obtained from a common heterodyne 160, a common transformer and a multiplicity of independent secondary windings. Each secondary 107 generates a high frequency constant voltage.

This voltage is introduced in series with the video intelligence voltages distributed in 100 individual condensers $103_1$ with a rectifier 108 in series: It is the well known process for modulation of a carrying wave.

The choice of the most appropriate carrying wave for the magnetic recorder is about 60,000 per second.

The modulated wave passes through 100 transformers 109 which isolate the 100 output circuits which can be grounded or connected together on conductor 170.

The secondary of these transformers 109 feed simultaneously the grid control of three tubes $100_1$ . . . $110_3$ connected to independent recorder $163_1$ of the groups. The plate of only one tube out of 3 receives at each time the voltage and consequently only one is operative at any time. The choice of the plate is in accordance with the order of the explorated frame, as explained in Figure 10 and 11.

The same disposition is realized in all other four odd groups fed with the same intermediate channel $161_1$.

And all the even groups $163_{II}$ . . . to $163_X$ are similarly activated as shown in Fig. 14.

The plates 110', $110'_2$, $110'_3$ are respectively linked to magnetic recorders 181, 182, 183, 184, 185, 186 in total number of 300 for the 3 points system in three separate groups operated on different portions of the recording cylinder length.

A commutator 190 is used for selectively controlling the three groups by successively applying the plate voltage to each group from battery 195. Sectors 191, 192, 193 are connected to the terminals of each group of recorders. The commutator is driven by a motor synchronized on the third of field frequency, so that the first field is recorded on the recorders connected to 191, and the second field is recorded through sector 192, etc.

The commutation circuit in Fig. 14 shows for simplicity of description only 3 sectors for recording 3 fields of a single complete frame in fine resolution. Actually, the recording is followed by reading the picture intelligence and therefore a spacing leads to have a commutator having six sectors instead of three, and a number of reading devices and individual connections equal to the number of recorders. In the three point system, the total number of magnetic heads and circuits is twice 300 that is 600; which allows to record an image on a portion of the cylinder and simultaneously read and erase the preceding image on another portion of the cylinder which are used alternately to that effect.

Fig. 15 shows the commutator in the case of the 5 point system with 10 sectors.

The system of commutation in each group of recorders includes a small multipolar motor 112, synchronized with the end of frame signal, drives a group of 10 brushes on 10 fixed sectors, disposed at equal angle one with another.

Nine of these brushes are simultaneously connected to the negative terminal of biasing battery 115, and only one brush is at the positive voltage and activates a recorder. The others are rendered inoperative by the biasing brushes.

On the same axis of this small synchronized motor brush 111 is driven on a 2 sector commutator to obtain the voltage in conductors $165_A$ and $165_A'$ which are used respectively for the alternate recording of 2 complete pictures and the reading of the record.

Figure 16 shows in a five dot system the means with ten wires $120_1$ . . . $120_{10}$ to successively feed the two conductors 88—89 and to obtain the order of sampling shown in Figures 10 and 11.

A delay line is used with a variable number of units, corresponding to the shifting of the dot of each horizontal line.

Each channel 120 feeds one of the control grids of tube 147 with two control grids and all the plates are connected in parallel. Normally all of the second grids are normally negatively biased and consequently all of the tubes are locked.

Each of these tubes are unlocked in turn through the means of a voltage introduced in series with the second grid.

The wires feeding these different grids are numbered $159_1$ . . . $159_5$ and $159_6$ . . . $159_{10}$. In a form of the invention they are connected to the commutator described in Figure 15, or to electronic switching means for high frequency commutation.

Figures 17 and 5 refer to an improvement of the invention in which the scanning is automatically made of different size in accordance with the fact that the light intensity of the dot sampled is varying or not in the course of time.

In Figure 17 it is shown in 200 the video voltage obtained from the electronic camera when the image of the subject is not varying that is when the subject is practically non moving.

It is shown in 201, 202 in dotted line the value of the video voltage when the subject is moving and therefore the light intensity of each dot is varying.

In Figure 17, the 2×5=10 first points of the picture are supposed to remain constant but on the contrary it is supposed that dots 11th to 25th in the line are varying in the course of time in correspondence with the curves 201, 202, 203, etc.

When the picture is not moving, the operation of "cutting into pieces" the signals above explained in connection with Figure 13 have for effect to give in course of the five successive frame scanning, signals that are shown in $M_1$, $M_2$, $M_3$, $M_4$, $M_5$. On the figure appears the order of the dot to be scanned successively as explained in Figure 10.

The ordinates of each signal are equal to the same of curve 200 as shown at the lower left part of Fig. 17. During all the time the picture is not moving the five range of signals are repeating without change.

On the contrary, when the object is changing and the light intensity of dot varies, the signals are variable in amplitude: Curves $N_1$, $N_2$, $N_3$, $N_4$, $N_5$ shows that the ordinate of each of the signals are equal to the same of dotted lines 201, 202, 203 etc.

According to the improvement of the invention, the change of the light density is automatically evidenced from the comparison of amplitude of the signals at each sampling of any dot, and which corresponds to a displacement of the subject. The ordinates $M_1$ are consequently compared to $N_1$ etc.

Figure 17 shows the curve of corresponding to the substraction $M_1-N_1$. On the 10 first points on the left of the figure there is no displacement, the differences are nil. They appear at the 11th dot, at the 12th dot etc.

The difference $M_1-N_1$ is shown in 204 etc. while the difference $M_5-N_5$ is shown in 206 etc.

When this difference is nil, the slow rate fine scanning comes from the recorder into play.

If the difference is not nil (positive or negative) above a certain value the high speed coarse scanning is automatically reinstated.

In the example of Figure 17, until the 10th point it is the slow rate fine scanning that is used. But when the difference is high enough the coarse scanning enters into play.

Also according to the invention, the same ordinate $N_1$ is consequently applied to the 4 dots following the explored dot.

In Figure 17, the five last lines of the figure shows at 204' the result of this operation. This first coarse scanning is preferably applied to 2 dots before and 2 dots after the dot sampled in course of scanning; in the figure it is applied to the 4 following dots.

The same description is applicable to the scanning of the following frames, where the coarse scanning is maintained as long as the difference $M-N$ is not quite nil.

Consequently:

The ordinate $N_2$ is extended to the 4 points 207'
The ordinate $N_3$ is extended to the 4 points 205'
The ordinate $N_4$ is extended to the 4 points 208'
The ordinate $N_5$ is extended to the 4 points 206'
And so on.

The same argument is applicable to the five following scannings; the differences 209, 210, 211, 212, 213 are not nil and consequently the scanning is continuously of "coarse" type.

But at the time where the difference becomes about nil (as in the case of 214) the "fine" type of scanning is used again instead of the "coarse." The ordinates $N_1$, $N_3$, $N_5$, $N_2$, $N_4$ are simultaneously used to reconstruct the successive dots of the picture as shown in the broken line 210, 220, 221, 222, 223 corresponding to the respective ordinate of the curves 200, 201, 202 successively used.

Consequently the passage from the fine scanning to the coarse scanning is automatically made when the difference is of a substantial value, and the return to the fine scanning is obtained automatically as soon as the difference is lower than a small value.

According to the invention this process gives consequently a picture very accurate in time, but middling in resolution when the picture is moving, and contrarily a very fine picture with accurate details but retarded in time by about ⅕th of a second when the subject is practically non-moving and the density of the points nonchanging. Therefore in all cases the utilization of the transmission of the video intelligence gives the maximum of opportunity to the spectator.

Fig. 5 shows a simplified circuit to obtain the result explained in the above described Figure 17 in the 5 point system.

In this figure the channel 88 is coming from the recorder through amplifier 399 (see Figure 3B).

Channel 389 arrives through the coaxial cable or like, from the sending station.

The two signals on wires 388 and 389 are continuously compared one with another in order to evidence the importance of the changing of the picture, and, are applied to tubes 90 and 91. The plate of these tubes are connected to resistor 90R and 91R. These resistors are adjustable so as to compensate the difference of the characteristics data of tubes if there are some.

The drop of voltage through these two resistors are compared one with the other. If no voltage appears between the plates of tubes 90 and 91, it means that the corresponding points of the televised picture have maintained substantially the same value of opacity. On the contrary, as a difference of voltage appears, the light density of the point on the picture has changed in the course of time between the two scannings. This change may be greater on the plate of tube 90 or alternatively on the plate of tube 91, and therefore the resulting voltage may be positive or negative. However, by the means of rectifier 92, the potential difference is rectified and therefore is made to operate in the same direction.

Block 102 is the final output circuit. Through this channel the signals of line 388 corresponding to the video channel are artificially reconstructed either by using the signals of five successive frames simultaneously, or alternatively the signals of channel 389 which corresponds to the coarse channel where the same values of voltage are applied to five successive points.

To obtain this result, the plates of tubes 100 and 101 are connected in parallel. These tubes are the means for locking or unlocking the transmission of the signals. These tubes have each two control grids. The modulated signals of channels 388 and 389 are applied, for example, on the control grid, and the other grid is used for locking and unlocking at appropriate time one or the other of the two channels. This action is commanded as a function of the voltage applied to the condenser 93.

A small difficulty for obtaining this result prevents the use of a common return wire and is overcome as follows:

According to this improvement of the invention, the voltages at the terminals of condenser 93 are applied positively to the grid of tube 100 and negatively to the grid of tube 101. To that effect heterodyne 95 generates a high frequency carrier wave in circuit 96 which is rectified by diode 97 and has its envelope varied or modulated by the the charge on condenser 93. Battery 99 polarizes the circuit to effect the desired sensitivity of response to changes in the charge on condenser 93. The high frequency voltage so obtained reacts on transformer 98 having two symmetrical secondary windings. The voltage at the terminals of the two secondary windings are rectified in opposite directions, and, due to battery B renders tube 100 conducting whenever condenser 93 is not charged to thus connect wire 388 to the output 362 and renders tube 101 conducting whenever condenser 93 is charged to thus connect wire 389 to the output 362.

It is understood that in connection with the fine dot system, five switches similar to switch 315 must be used in place of each group of three such switches and all other switch blades must be modified to conform to the fine circuits thus established.

I claim to have invented:

1. In a system for transmitting with reduced bandwidth a signal that periodically repeats itself and which may have changes in the signal shape during repetitions thereof, in combination, means for transmitting impulses respectively representative of the amplitudes of equally spaced points along the signal and thereafter transmitting impulses representative of points along the next signal which points are time displaced from the origin of the second signal at values intermediate the values of time displacements of said points of the first signal, said means including means for intermittently repeating its transmissions to send impulses representative of points along succeeding signals that are complementary to the points involved in the first two aforesaid transmissions, and a receiver for reconstituting the transmitted signals comprising recording means for recording the transmitted signals in the order that they are received, and comparison means for comparing the recorded values with the values subsequently received which are representative of the same points along the signal that are represented by the recorded values, said comparison means including an output and switching means for connecting the recorder to the output when the comparison means indicates no difference between the values being compared and connecting the received signals directly to said output when the comparison means indicates a difference in the values being compared.

2. In a device for transmitting with reduced bandwidth a signal that periodically repeats itself with modifications in its signal shape during certain repetitions, in combination with means for producing the periodically repeating signal which repeats itself at equally spaced time intervals, modulating means for intermittently passing at equally spaced intervals excerpts of the signal and later passing excerpts of the next wave which are at the same equally spaced time intervals apart as the excerpts of the first signal but displaced in time from the starting axis of the second wave to a different extent than the excerpts of the first signal were displaced from the starting axis of the first signal, said modulating means including means for repeating its transmissions for subsequent signals that appear, and means for reconstituting a signal from the output of the modulating means comprising all of the following parts, recording means for recording the output of said modulating means, comparison means for comparing the recorded information with complementary information appearing in signals subsequently leaving the modulating means, and an output, said comparison means including means for connecting the output of the modulating means directly to said output when the comparison means detects a difference in the informations being compared and for connecting the recording means to said output when the comparison means does not detect a difference in the informations being compared.

3. The combination with means for producing a series of electrical signals of equal length and which occur sequentially, of a gate having a trigger which when actuated passes said signals, means for triggering said gate for a time duration $t$ at each of a number of equally spaced time intervals along the first signal of the series and then doing the same thing for a signal of the series occurring $n$ signals later with the triggering impulses of the first signal and the signal occurring $n$ signals later being at complementary time displacements along the two signals as measured from their respective starting axes, means for triggering said gate for a time duration $t$ at each of a number of equally spaced time intervals along the second signal of the series and then doing the same thing for a signal of the series occurring $n$ signals later with the triggering impulses of the second signal and the signal occurring $n$ signals thereafter being at complementary time displacements along the two signals as measured from their starting axes and displaced by the time $t$ from the complementary time displacements of the impulses along the first signal of the series, and a receiver for reconstituting the output of said gate comprising all of the following parts, a recorder for recording the output of said gate in the order it is received, said recorder including pick-up means for reproducing the recorded information exactly $n$ signals after it was recorded, comparison circuit means for comparing the signals from the pick-up means with the signals currently being received from said gate, an output, switching means for transposing the order of the impulses from said pick-up means to place them in an order representative of their respective time displacements from the starting axes of their respective signals, a delay line in the output of said switching means for delaying the signals by at least the time $t$, and a shock-excited oscillator which is excited by signals currently being received by said gate, said comparison circuit means including means for connecting the delay line to said output when the comparison means indicates that there is no difference in the signals being compared and for connecting said oscillator to said output when the comparison means indicates that there is a difference between the signals being compared.

4. In a television transmission system, means for producing a signal of variable amplitude representative of the picture, means for selecting impulses at spaced regular intervals along the signal and transmitting them, and a receiving station including oscillator means excited by the received impulses to generate impulses to fill in the spaces between received impulses.

5. In a television system, means for producing end of line signals, means for dividing the frequency of the end of line signals to half their frequency, means for converting the energy at the divided frequency into two groups of pulses that are out of phase with each other, first control means in the video circuit for transmitting the video signals in response to pulses of one of said groups, and second control means in the video circuit for transmitting the video signals with a time delay greater than any delay in the first control means in response to pulses of the other of said groups.

6. In a television system, means for producing a video signal comprising means for scanning a series of parallel lines, means for transmitting spaced impulses selected along said signal, means for delaying the signal of certain lines more than those of other lines, receiving means for receiving the transmitted impulses, means for delaying certain of the received signals more than others to compensate for the delays effected at the transmitter, and an oscillator triggered by the impulses received for generating oscillations to fill in the spaces between received impulses.

7. In a television transmission and receiving system, in combination, first means for producing a video signal having a series of fields, second means which during the period of the first field transmits only a series of spaced pulses representative of spaced spots of the picture, third means which during the period of the second field transmits only a series of spaced pulses representative of spaced spots of the picture which are interposed between the first-named series of spots, fourth means for successively transmitting the outputs of said second and third named means to the receiving station; first recording means at the receiving station for recording the signals transmitted by the second-named means, second recording means at the receiving station for recording the signals transmitted by the third named means, an output, and means for alternately feeding the individual record pulses of the first and second recording means to said output.

8. A transmission and receiving system as defined in claim 7 in which the first named means includes means for producing interlaced scanning, and in which at the receiving station there are two sets of receiving apparatus each like the receiving station defined in claim 7, and means synchronized with the interlaced scanning for alternately selecting the two outputs.

9. Apparatus for transmitting and receiving with reduced bandwith comprising means including a television camera for transmitting a succession of fields, said means including means for effecting interlaced scanning, means in the output of the camera for allowing only spaced signals to pass in which the signals in the several fields have the same repetition rate and are displaced in phase successively in response to each new field until finally after a predetermined number of fields the spaced signals represent the same spots on the picture as did the complementary signals which were transmitted during the first field, transmission means for transmitting said signals to a remote location, and receiving apparatus at the remote location for reproducing the output of the camera comprising switching means for alternately connecting the received input to first and second circuits according to which field of the interlaced scanning signal is being transmitted, a series of recorders in said first circuit, one such recorder for each field of said predetermined number, switching means for shifting the signals in the first circuit to the recorder which is complementary to the field being transmitted, a series of recorders in said second circuit, one such recorder for each field of said predetermined number, switching means for shifting the signals in the second circuit to the recorder which is complementary to the field being transmitted, and means for deriving signals from said recorders in correct sequence to reconstitute the picture.

10. Apparatus as defined in claim 9 in which the last-named means includes all of the following: means for comparing the signals currently being received from the transmission means with complementary recorded signals, and means responsive to such comparison to feed the said signals currently being received to the output when the comparison indicates a change and to feed the recorded signals to the output when the comparison indicates no change in the picture.

11. In a television system, a television camera having a wide band output, means associated with said camera to cause it to scan a plurality of fields, means to reduce the bandwidth of the output of said camera comprising means in said output for allowing only part of the signals in each field to pass and which after a plurality of $n$ fields the aggregate of all the signals that have passed will include a signal representative of each spot of the whole picture, means for transmitting the output of said last-named means to the receiving station, recording means at the receiver for recording all of the transmitted signals, and output means for reconstituting the picture from the recorded signals.

12. A system as defined in claim 11 in which the recording means includes $n$ recorders, each one of which is complementary to one of said $n$ fields, and switching means for shifting the signals at the receiver to the recorder which is complementary to the field being transmitted.

13. A system as defined in claim 11 in which the output means includes means for utilizing the same recorded signals many times to repeatedly display the picture.

14. A system as defined in claim 13 in which the output means includes means to insert signals currently being received in place of the recorded signals when the signals currently being received differ from the recorded signals.

15. A system as defined in claim 14 in which the output means includes means for broadening the signals currently being received when directly inserting it into the picture in the place of recorded signals.

16. A television receiver for receiving a video signal made up of a series of fields with each field having a series of lines and the signals of each field being in the form of discrete pulses at least some of which represent picture dots with a plurality of adjacent such dots forming a picture area that has horizontal and vertical dimensions that are a small fraction of those of the picture and with the different pulses for at least some of said picture areas being in different fields so that a plurality of fields must be received in order to have available a pulse for each dot of such area, means for receiving said discrete pulses forming said video signal, means selectively operable to utilize a received discrete pulse to provide the signal for only one dot of one of said areas or the signal for at least the major part of the same area, and means controlled by received signals for controlling the last-named means to cause it to utilize the pulse as the signal for the dot only or as the signal for the major part of the area.

17. A television receiver for receiving a video signal made up of a series of fields with each field having a series of lines and the signals of each field being in the form of discrete pulses at least some of which represent picture dots with a plurality of adjacent such dots forming a picture area that has horizontal and vertical dimensions that are a small fraction of those of the picture and with the different pulses for at least some of said picture areas being in different fields so that a plurality of fields must be received in order to have available a pulse for each dot of such area, means for receiving said discrete pulses forming said video signal, means operable to use a received pulse as a signal for just one dot of the picture or alternatively as a signal for the major part of the area containing such dot, and selecting means controlled by received signals responsive to whether or not the picture at any particular one of said areas is moving or stationary for controlling the second-named means to determine whether a discrete pulse representative of said area is to furnish the signal for a dot only or is to furnish the signal for the major part of the area containing the dot.

18. A television receiver for receiving a video signal made up of a series of fields with each field having a series of lines and the signals of each field being in the form of discrete pulses at least some of which represent picture dots with a plurality of adjacent such dots forming a picture area that has horizontal and vertical dimensions that are a small fraction of those of the picture and with the different pulses for at least some of said picture areas being in different fields so that a plurality of fields must be received in order to have available a pulse for each dot of such area, means for receiving said discrete pulses forming said video signal, means selectively operable to utilize a received discrete pulse to provide the signal for at least the major part of its complementary one of said areas, and means responsive to receive signals for determining whether a given discrete pulse is to be utilized to provide the signal for at least the major part of its complementary one of said areas.

19. A television receiver for receiving a video signal made up of a series of lines which in turn make up a series of fields comprising means for developing the aforesaid video signal as well as a signal that indicates whether or not at a given instant the video signal represents a picture that is stationary or one that is moving, means operable to utilize a small increment of one line of the signal to control an area of the picture that would normally be controlled by a larger increment of the signal but which larger increment is still small as compared to the dimensions of the picture, and control means controlled by the signal that indicates whether the picture is stationary or moving for controlling the second-named means to cause it to determine whether a given small increment of a line is to control said larger increment.

20. A television receiver as defined in claim 19 in which the first-named means includes means in the receiver for determining whether or not the picture is moving; said control means causing the second-named means to utilize a received signal to control said larger increment when the picture is moving.

21. In a television system, means for producing a video signal made up of a series of fields, means to reduce the bandwidth of said signal comprising means for transmitting spaced signals from each field, with the signals of each field occurring after all the signals of the preceding field had been transmitted and representative of spots of the picture different than the spots represented by signals of the preceding field until after a plural number of fields have been transmitted the transmission operation repeats itself, a receiver for the transmitted signals including delay means into which the received signals are fed, and means to read the signals out of the delay means in a different order than they were entered therein to produce a usable video signal.

22. In a television system as defined in claim 20, said delay means comprising storage means.

23. In a television system, means for producing a video signal made up of a series of fields, means to reduce the bandwidth of said signal comprising means which during the period of each field selects from the signal of the field and transmits a series of spaced pulses with the selected pulses of each field representative of spaced spots of the picture different than in the case of the preceding field until after a plural number of fields have been transmitted the transmission operation repeats itself, a receiver for the transmitted signals including a storage means, and means in the receiver for applying the received pulses to the storage means in the order of their receipt and reading them out in a different order in which said spaces between pulses of a field are filled with a pulse from each of the other of said plural number of fields.

24. In a television system, means for producing a video signal made up of a series of fields, means to reduce the bandwidth of said signal comprising means for transmitting spaced signals from each field with the signals of each field representative of different spaced spots of the picture than in the case of the preceding field until after a predetermined plural number $n$ of fields the transmission operation repeats itself, a receiver for the transmitted signals including $n$ storage devices, one for each of said plural number of fields, and means in the receiver for feeding the received signals for each field into its complementary storage device and for reading the signals out of storage in a selected order that fills said spaces between the signals of one field with a signal from each of the other fields to thus reconstitute the video signal.

25. A television system as defined in claim 24 in which the first-named means also produces a synchronizing signal, the second-named means including means for transmitting the synchronizing signal to the receiver, and the third-named means comprising two switching systems both operating under control of the synchronizing signal and the first such system switching the signals from each field into the storage device complementary to that field with the signals of each field being stored in the storage device for that field in the same order as they were transmitted and the second switching system connecting a different one of the storage devices to the output at $n$ times the frequency of the spaced signals of each field until $n$ signals have been read out of storage at which time the reading operation repeats itself.

26. In a television system, means for producing a video signal made up of a series of fields, means for transmitting the signal with reduced bandwidth by transmitting signals from each field in a narrower band than is required by the video signal, a receiver including means for delaying the received signals and then combining them to reconstitute a video signal of wider band and greater definition than that transmitted, comparison means in the receiver for comparing the signals currently being received with delayed signals representative of the same picture spot and detecting changes to thus determine if the picture is stationary or moving so far as the spot whose signals are being compared is concerned, an output, and means responsive to said comparison means for feeding the signals currently being received to the output when the comparison means detects a change and for feeding the delayed signals to the output when the comparison means does not detect a change.

27. In a television system, means for developing a video signal made up of a series of frames and including a synchronizing signal, delay means, and switching means controlled by the synchronizing signal for intermittently passing parts of each frame of the video signal through the delay means to delay those parts of the video signal.

28. In a television system, means for developing a video signal made up of a series of frames and a synchronizing signal, means through which said video signal passes and which is selectively operable to delay signals passed therethrough, and means controlled by said synchronizing signal for selectively operating the second-named means to alter the displacement of certain parts of each frame with respect to other parts of the frame.

29. In a television system, means for developing a video signal and a synchronizing signal, delay means having plural paths therethrough which respectively effect different periods of delay, and switching means controlled by said synchronizing signal and which passes through a cycle of operations which cause a predetermined number of parts of the picture to be respectively passed through said different paths to give them different delays and after which the cycle repeats.

30. In a television system as defined in claim 29, in which the first-named means includes means whereby the synchronizing signal is an end of line signal.

31. In a television system, means for developing a video signal made up of a series of lines and including a synchronizing signal, delay means having at least three different paths therethrough that give at least three different delay periods, and switching means controlled by said synchronizing signal and which passes through a cycle of operations which causes a series of adjacent lines of the picture to respectively pass through said different paths to thus displace the lines of the series with respect to each other.

32. In a television system as defined in claim 31, said first-named means being a receiver that develops its video and synchronizing signals by receiving a transmitted signal and deriving the video and synchronizing signals therefrom.

33. In a television system as defined in claim 31, in which the first-named means is a television camera at a television transmitting station.

34. In a television system, an output, means for producing a video signal made up of a series of fields, means for extracting from the video signal a series of coarse video signals respectively representative of given areas of the picture, means for extracting from the video signal a series of high definition signals for said given areas of the picture with the high definition signals comprising a series of pulses respectively taken from successive fields and with each pulse representing a different dot on the picture, and switching means for selecting either the coarse or the high definition signal depending on whether or not the picture represented by the area to be transmitted is moving and feeding the selected signal to the output.

35. In a television system according to claim 34, said switching means feeding the coarse signal to the output when the picture is moving and the high definition signal to the output when the picture is stationary.

(References on following page)

References Cited in the file of this patent

UNITED STATES PATENTS

| | | |
|---|---|---|
| 2,000,694 | Felix | May 7, 1935 |
| 2,002,208 | McFarlane | May 21, 1935 |
| 2,115,894 | Watson | May 3, 1938 |
| 2,202,605 | Schroter | May 28, 1940 |
| 2,321,611 | Moynihan | June 15, 1943 |
| 2,406,266 | Sziklai | Aug. 20, 1946 |
| 2,436,516 | Larson et al. | Feb. 24, 1948 |
| 2,472,774 | Mayle | June 7, 1949 |
| 2,479,880 | Toulon | Aug. 23, 1949 |
| 2,492,926 | Valensi | Dec. 27, 1949 |
| 2,505,029 | Carbrey | Apr. 25, 1950 |
| 2,513,176 | Homrighous | June 23, 1950 |
| 2,517,265 | Wald | Aug. 1, 1950 |
| 2,517,808 | Sziklai | Aug. 8, 1950 |
| 2,532,511 | Okolicsanyi | Dec. 5, 1950 |
| 2,623,941 | Aram | Dec. 30, 1952 |
| 2,636,936 | Goldsmith | Apr. 28, 1953 |
| 2,683,191 | Levy | July 6, 1954 |

FOREIGN PATENTS

| | | |
|---|---|---|
| 928,783 | France | June 16, 1947 |